US012591995B2

(12) United States Patent
Yin et al.

(10) Patent No.: US 12,591,995 B2
(45) Date of Patent: Mar. 31, 2026

(54) METHOD AND APPARATUS FOR DEFORMATION MEASUREMENT, ELECTRONIC DEVICE, AND STORAGE MEDIUM

(71) Applicants: SHENZHEN UNIVERSITY, Shenzhen Guangdong (CN); Shenzhen Wivision Technology Co., Ltd., Shenzhen Guangdong (CN)

(72) Inventors: Yihe Yin, Shenzhen Guangdong (CN); Qifeng Yu, Shenzhen Guangdong (CN); Xiaolin Liu, Shenzhen Guangdong (CN); Yueqiang Zhang, Shenzhen Guangdong (CN); Biao Hu, Shenzhen Guangdong (CN)

(73) Assignees: SHENZHEN UNIVERSITY, Shenzhen (CN); SHENZHEN WIVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/890,979

(22) Filed: Sep. 20, 2024

(65) Prior Publication Data

US 2025/0014216 A1    Jan. 9, 2025

Related U.S. Application Data

(63) Continuation of application No. PCT/CN2022/082049, filed on Mar. 21, 2022.

(51) Int. Cl.
*H04N 7/18* (2006.01)
*G01M 5/00* (2006.01)
(Continued)

(52) U.S. Cl.
CPC ............... *G06T 7/73* (2017.01); *G01M 5/005* (2013.01); *G01M 5/0091* (2013.01); *G06T 7/0002* (2013.01)

(58) Field of Classification Search
CPC ........ G06T 7/73; G06T 7/0002; G01M 5/005; G01M 5/0091; H04N 7/18
(Continued)

(56) References Cited

U.S. PATENT DOCUMENTS

| | | | | |
|---|---|---|---|---|
| 9,953,245 B2 * | 4/2018 | Palacio | .................... | G08G 1/04 |
| 11,355,014 B1 * | 6/2022 | Baik | ...................... | G06V 40/20 |
| 2022/0169245 A1 * | 6/2022 | Hieida | ................... | G08G 1/162 |

FOREIGN PATENT DOCUMENTS

| | | |
|---|---|---|
| CN | 204007533 U | 12/2014 |
| CN | 104316024 A | 1/2015 |

(Continued)

OTHER PUBLICATIONS

International Search Report dated Dec. 23, 2022 issued in PCT/CN2022/082049.
(Continued)

*Primary Examiner* — Trang U Tran

(74) *Attorney, Agent, or Firm* — Scully, Scott, Murphy & Presser, P.C.

(57) ABSTRACT

A method for deformation measurement is provided. When the mobile platform moves to a first monitoring position in an area to-be-measured, a first image is obtained by photographing $J_1$ monitoring points in a first area to-be-measured in the area to-be-measured, and a second image is obtained by $J_2$ monitoring points in a second area to-be-measured in the area to-be-measured. When the mobile platform moves to a second monitoring position, a third image is obtained by photographing the $J_1$ monitoring points, and a fourth image is obtained by photographing the $J_2$ monitoring points. $J_1$
(Continued)

MOBILE PLATFORM 20

CAMERA ARRAY 30

CLOUD PROCESSING TERMINAL 40

APPARATUS 10 FOR DEFORMATION MEASUREMENT first monitoring points are determined according to the first image and the third image, and $J_2$ second monitoring points are determined according to the second image and the fourth image. A horizontal displacement amount and a vertical subsidence amount of each of the $J_1$ first monitoring points and the $J_2$ second monitoring points are obtained.

10 Claims, 6 Drawing Sheets

(51) Int. Cl.
    *G06T 7/00*         (2017.01)
    *G06T 7/73*         (2017.01)

(58) Field of Classification Search
    USPC ........................................................ 348/139
    See application file for complete search history.

(56) References Cited

FOREIGN PATENT DOCUMENTS

| CN | 107085853 | A | | 8/2017 | | |
|----|-----------|---|---|--------|---|---|
| CN | 108487216 | A | | 9/2018 | | |
| CN | 109373921 | A | | 2/2019 | | |
| CN | 111189403 | A | | 5/2020 | | |
| CN | 112629431 | A | * | 4/2021 | ............ | G01B 11/16 |
| JP | 2002357557 | A | | 12/2002 | | |
| JP | 2004309491 | A | | 11/2004 | | |
| JP | 2018207194 | A | | 12/2018 | | |

OTHER PUBLICATIONS

Extended European search report issued in corresponding EP application No. 22932550.1 dated Mar. 17, 2025.
Notice of Reasons for Refusal issued in corresponding JP application No. 2024-556088 dated Aug. 20, 2025.

* cited by examiner

MOBILE
PLATFORM
20                              CAMERA ARRAY 30

APPARATUS 10 FOR
DEFORMATION MEASUREMENT

MOBILE
PLATFORM                         CAMERA ARRAY 30
20

CLOUD PROCESSING
TERMINAL 40

APPARATUS 10 FOR
DEFORMATION MEASUREMENT

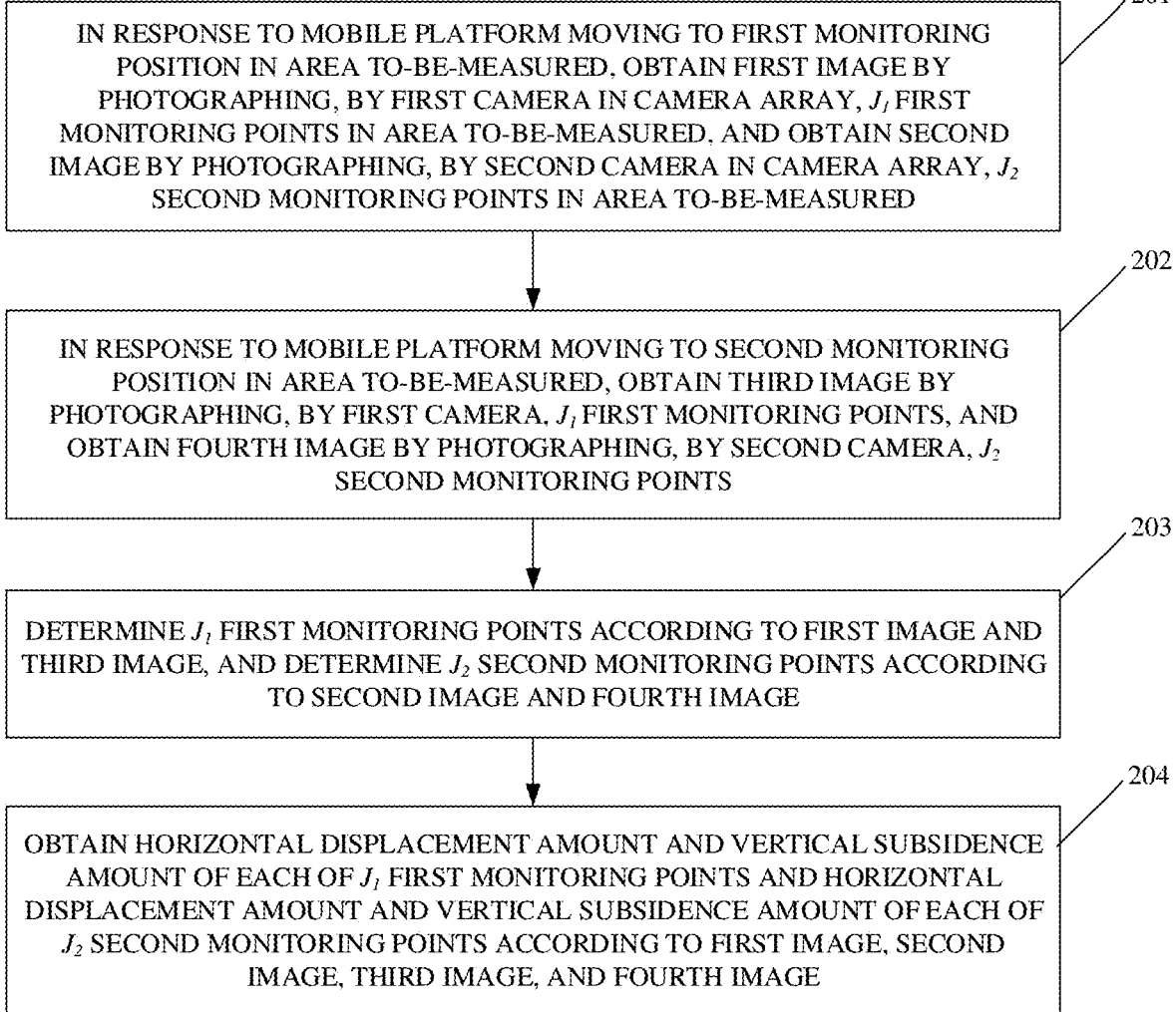

201

IN RESPONSE TO MOBILE PLATFORM MOVING TO FIRST MONITORING POSITION IN AREA TO-BE-MEASURED, OBTAIN FIRST IMAGE BY PHOTOGRAPHING, BY FIRST CAMERA IN CAMERA ARRAY, $J_1$ FIRST MONITORING POINTS IN AREA TO-BE-MEASURED, AND OBTAIN SECOND IMAGE BY PHOTOGRAPHING, BY SECOND CAMERA IN CAMERA ARRAY, $J_2$ SECOND MONITORING POINTS IN AREA TO-BE-MEASURED

202

IN RESPONSE TO MOBILE PLATFORM MOVING TO SECOND MONITORING POSITION IN AREA TO-BE-MEASURED, OBTAIN THIRD IMAGE BY PHOTOGRAPHING, BY FIRST CAMERA, $J_1$ FIRST MONITORING POINTS, AND OBTAIN FOURTH IMAGE BY PHOTOGRAPHING, BY SECOND CAMERA, $J_2$ SECOND MONITORING POINTS

203

DETERMINE $J_1$ FIRST MONITORING POINTS ACCORDING TO FIRST IMAGE AND THIRD IMAGE, AND DETERMINE $J_2$ SECOND MONITORING POINTS ACCORDING TO SECOND IMAGE AND FOURTH IMAGE

204

OBTAIN HORIZONTAL DISPLACEMENT AMOUNT AND VERTICAL SUBSIDENCE AMOUNT OF EACH OF $J_1$ FIRST MONITORING POINTS AND HORIZONTAL DISPLACEMENT AMOUNT AND VERTICAL SUBSIDENCE AMOUNT OF EACH OF $J_2$ SECOND MONITORING POINTS ACCORDING TO FIRST IMAGE, SECOND IMAGE, THIRD IMAGE, AND FOURTH IMAGE

FIG. 2

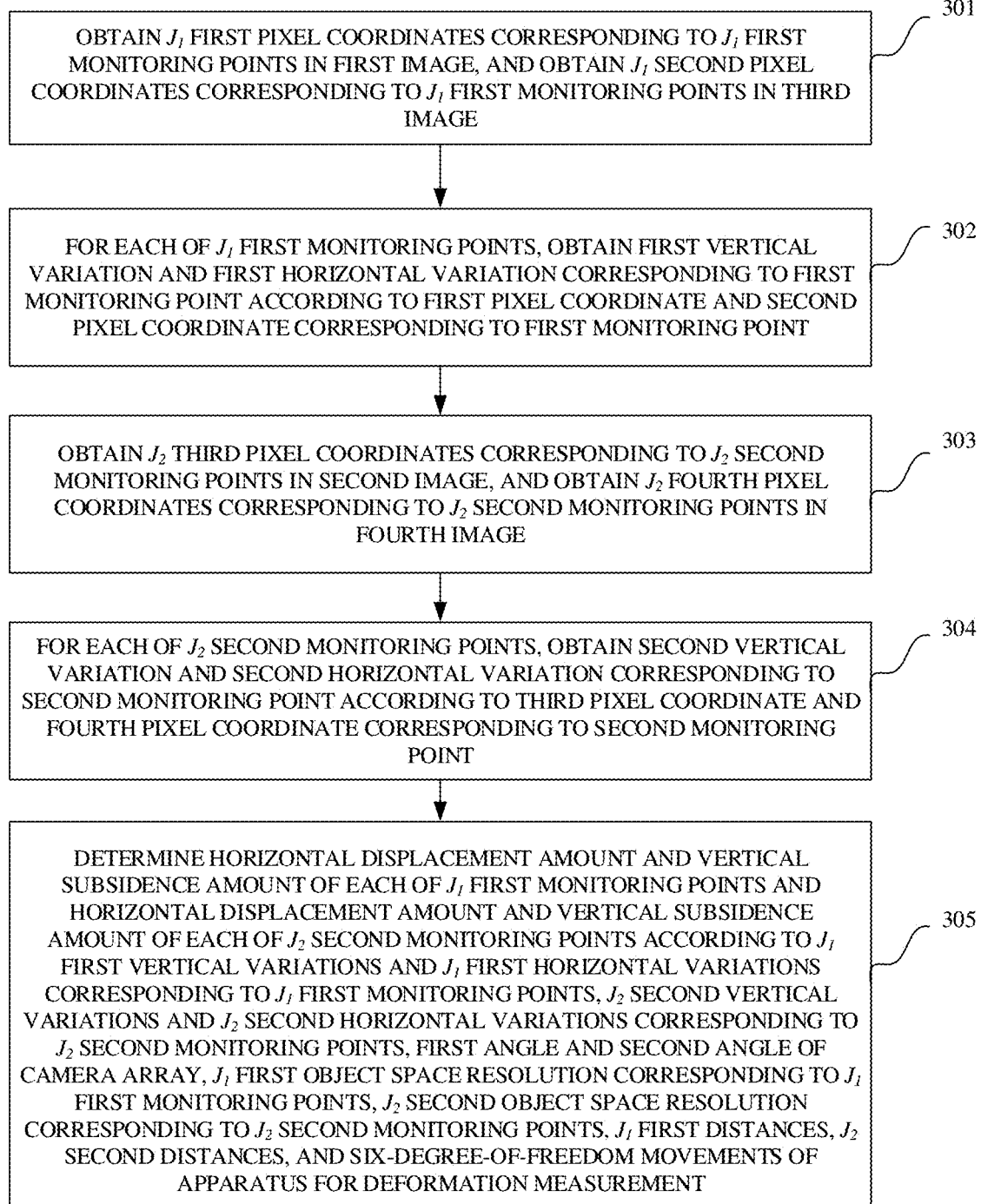

OBTAIN $J_1$ FIRST PIXEL COORDINATES CORRESPONDING TO $J_1$ FIRST MONITORING POINTS IN FIRST IMAGE, AND OBTAIN $J_1$ SECOND PIXEL COORDINATES CORRESPONDING TO $J_1$ FIRST MONITORING POINTS IN THIRD IMAGE — 301

FOR EACH OF $J_1$ FIRST MONITORING POINTS, OBTAIN FIRST VERTICAL VARIATION AND FIRST HORIZONTAL VARIATION CORRESPONDING TO FIRST MONITORING POINT ACCORDING TO FIRST PIXEL COORDINATE AND SECOND PIXEL COORDINATE CORRESPONDING TO FIRST MONITORING POINT — 302

OBTAIN $J_2$ THIRD PIXEL COORDINATES CORRESPONDING TO $J_2$ SECOND MONITORING POINTS IN SECOND IMAGE, AND OBTAIN $J_2$ FOURTH PIXEL COORDINATES CORRESPONDING TO $J_2$ SECOND MONITORING POINTS IN FOURTH IMAGE — 303

FOR EACH OF $J_2$ SECOND MONITORING POINTS, OBTAIN SECOND VERTICAL VARIATION AND SECOND HORIZONTAL VARIATION CORRESPONDING TO SECOND MONITORING POINT ACCORDING TO THIRD PIXEL COORDINATE AND FOURTH PIXEL COORDINATE CORRESPONDING TO SECOND MONITORING POINT — 304

DETERMINE HORIZONTAL DISPLACEMENT AMOUNT AND VERTICAL SUBSIDENCE AMOUNT OF EACH OF $J_1$ FIRST MONITORING POINTS AND HORIZONTAL DISPLACEMENT AMOUNT AND VERTICAL SUBSIDENCE AMOUNT OF EACH OF $J_2$ SECOND MONITORING POINTS ACCORDING TO $J_1$ FIRST VERTICAL VARIATIONS AND $J_1$ FIRST HORIZONTAL VARIATIONS CORRESPONDING TO $J_1$ FIRST MONITORING POINTS, $J_2$ SECOND VERTICAL VARIATIONS AND $J_2$ SECOND HORIZONTAL VARIATIONS CORRESPONDING TO $J_2$ SECOND MONITORING POINTS, FIRST ANGLE AND SECOND ANGLE OF CAMERA ARRAY, $J_1$ FIRST OBJECT SPACE RESOLUTION CORRESPONDING TO $J_1$ FIRST MONITORING POINTS, $J_2$ SECOND OBJECT SPACE RESOLUTION CORRESPONDING TO $J_2$ SECOND MONITORING POINTS, $J_1$ FIRST DISTANCES, $J_2$ SECOND DISTANCES, AND SIX-DEGREE-OF-FREEDOM MOVEMENTS OF APPARATUS FOR DEFORMATION MEASUREMENT — 305

FIG. 3

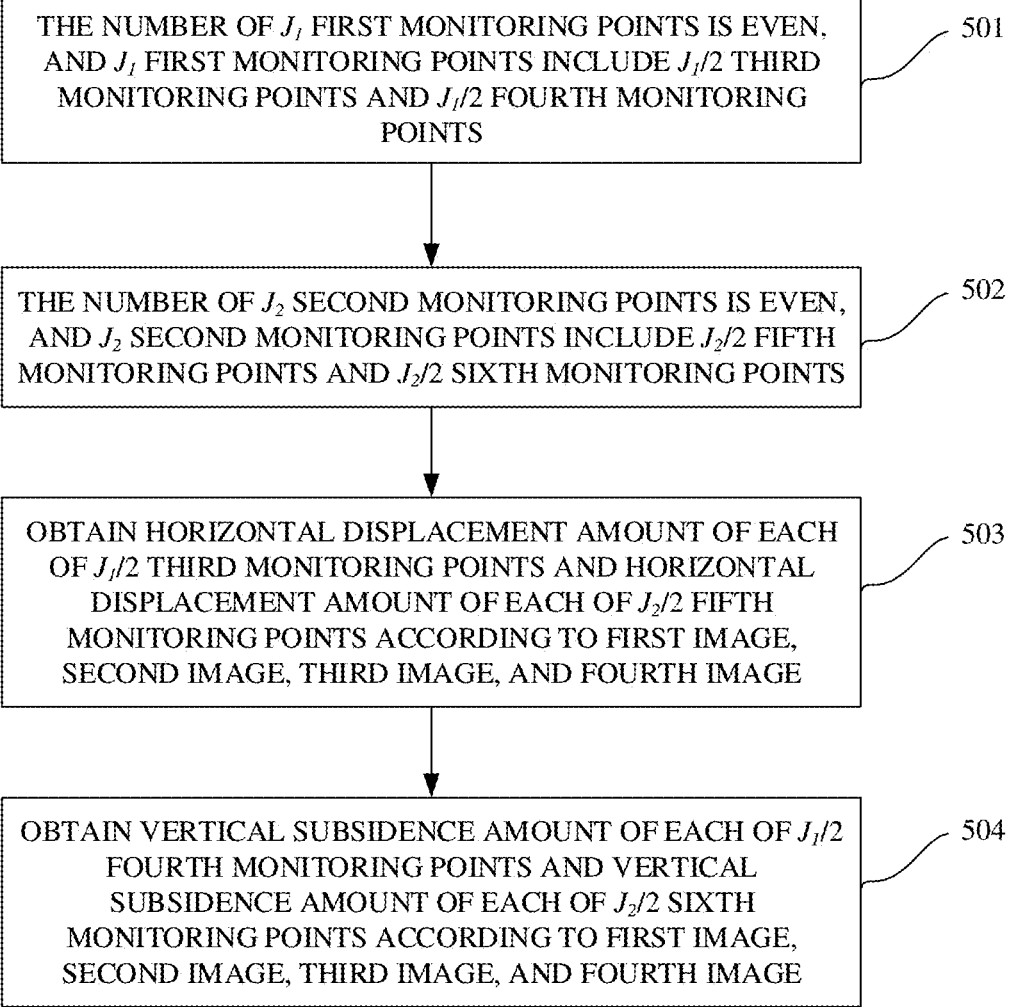

THE NUMBER OF $J_1$ FIRST MONITORING POINTS IS EVEN, AND $J_1$ FIRST MONITORING POINTS INCLUDE $J_1/2$ THIRD MONITORING POINTS AND $J_1/2$ FOURTH MONITORING POINTS ⟋ 501

THE NUMBER OF $J_2$ SECOND MONITORING POINTS IS EVEN, AND $J_2$ SECOND MONITORING POINTS INCLUDE $J_2/2$ FIFTH MONITORING POINTS AND $J_2/2$ SIXTH MONITORING POINTS ⟋ 502

OBTAIN HORIZONTAL DISPLACEMENT AMOUNT OF EACH OF $J_1/2$ THIRD MONITORING POINTS AND HORIZONTAL DISPLACEMENT AMOUNT OF EACH OF $J_2/2$ FIFTH MONITORING POINTS ACCORDING TO FIRST IMAGE, SECOND IMAGE, THIRD IMAGE, AND FOURTH IMAGE ⟋ 503

OBTAIN VERTICAL SUBSIDENCE AMOUNT OF EACH OF $J_1/2$ FOURTH MONITORING POINTS AND VERTICAL SUBSIDENCE AMOUNT OF EACH OF $J_2/2$ SIXTH MONITORING POINTS ACCORDING TO FIRST IMAGE, SECOND IMAGE, THIRD IMAGE, AND FOURTH IMAGE ⟋ 504

FIG. 5

METHOD AND APPARATUS FOR DEFORMATION MEASUREMENT, ELECTRONIC DEVICE, AND STORAGE MEDIUM

CROSS-REFERENCE TO RELATED APPLICATIONS

This application is a continuation of International Application No. PCT/CN2022/082049, filed on Mar. 21, 2022, the entire disclosure of which is incorporated herein by reference.

TECHNICAL FIELD

This disclosure relates to the field of image processing technologies, and in particular to a method and an apparatus for deformation measurement, an electronic device, and a storage medium.

BACKGROUND

At present, for deformation measurement of large-scale structural engineering, videometric technologies with a series-parallel camera network are proposed to realize the deformation measurement. For one thing, in this way, fixed monitoring stations are required when the series-parallel camera network is constructed. For engineering monitoring requirements for large-range, long-distance and multi-point monitoring, such as urban road subsidence monitoring, railway roadbed subsidence monitoring, tunnel vault subsidence and arch waist horizontal convergence deformation monitoring, etc., a large number of monitoring devices need to be deployed, resulting in a relatively large investment in the devices. For another thing, a large number of fixed monitoring stations may not be able to be deployed in an on-site monitoring environment. Therefore, it is urgent to provide a simple, efficient, and automatic method for large-scale structural deformation measurement that is applicable to all monitoring scenarios and can save costs.

SUMMARY

In a first aspect, a method for deformation measurement is provided in implementations of the present disclosure. The method is applicable to an apparatus for deformation measurement, the apparatus for deformation measurement includes a camera array and a mobile platform, and the method includes the following. When the mobile platform moves to a first monitoring position in an area to-be-measured, a first image is obtained by photographing, by a first camera in the camera array, monitoring points in a first area to-be-measured in the area to-be-measured, and a second image is obtained by photographing, by a second camera in the camera array, monitoring points in a second area to-be-measured in the area to-be-measured; where the monitoring points in the first area to-be-measured are disposed on one side of the first monitoring position, the monitoring points in the second area to-be-measured are disposed on the other side of the first monitoring position, and the first camera has an opposite photographing direction with the second camera. When the mobile platform moves to a second monitoring position in the area to-be-measured, a third image is obtained by photographing, by the first camera, the monitoring points in the first area to-be-measured, and a fourth image is obtained by photographing, by the second camera, the monitoring points in the second area to-be-measured. $J_1$ first monitoring points are determined according to the first image and the third image, and $J_2$ second monitoring points are determined according to the second image and the fourth image; where the $J_1$ first monitoring points are monitoring points included in both the first image and the third image, and the $J_2$ second monitoring points are monitoring points included in both the second image and the fourth image. A horizontal displacement amount and a vertical subsidence amount of each of the $J_1$ first monitoring points and a horizontal displacement amount and a vertical subsidence amount of each of the $J_2$ second monitoring points are obtained according to the first image, the second image, the third image, and the fourth image.

In a second aspect, an electronic device is provided in implementations of the present disclosure. The electronic device includes a memory and a processor. The memory is configured to store a computer program. The processor is connected to the memory and configured to execute the computer program stored in the memory to cause the electronic device to perform the method in the first aspect.

In a third aspect, a non-transitory computer-readable storage medium is provided in implementations of the present disclosure. The computer-readable storage medium is configured to store a computer program, and the computer program causes a computer to perform the method in the first aspect.

BRIEF DESCRIPTION OF THE DRAWINGS

In order to describe more clearly technical solutions of the present disclosure, the following will give a brief introduction to accompanying drawings used for describing implementations. Apparently, the accompanying drawings described below are some implementations of the present disclosure. Based on these drawings, those of ordinary skill in the art can also obtain other drawings without creative effort.

FIG. 2 is a schematic flowchart of a method for deformation measurement provided in implementations of the present disclosure.

FIG. 3 is a schematic flowchart illustrating obtainment of a horizontal displacement amount and a vertical subsidence amount of each of $J_1$ first monitoring points and a horizontal displacement amount and a vertical subsidence amount of each of $J_2$ second monitoring points according to a first image, a second image, a third image, and a fourth image provided in implementations of the present disclosure.

FIG. 5 is a schematic flowchart of a method for deformation measurement provided in other implementations of the present disclosure.

DETAILED DESCRIPTION

Technical solutions of implementations of the present disclosure will be described clearly and completely below with reference to accompanying drawings in implementations of the present disclosure. Apparently, implementations described herein are some implementations, rather than all implementations, of the present disclosure. Based on implementations of the present disclosure, all other implementations obtained by those of ordinary skill in the art without creative effort shall fall within the protection scope of the present disclosure.

The terms "first", "second", "third", "fourth", and the like used in the specification, the claims, and the accompanying drawings of the present disclosure are used to distinguish different objects rather than describe a particular order. In addition, the terms "include", "comprise", and "have" as well as variations thereof are intended to cover a non-exclusive inclusion. For example, a process, method, system, product, or device including a series of steps or units is not limited to the listed steps or units, and instead, it can optionally include other steps or units that are not listed or other steps or units inherent to the process, method, product, or device.

The term "implementations" referred to in implementations of the present disclosure means that a particular feature, structure, or characteristic described in conjunction with the implementation may be contained in at least an implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1A:
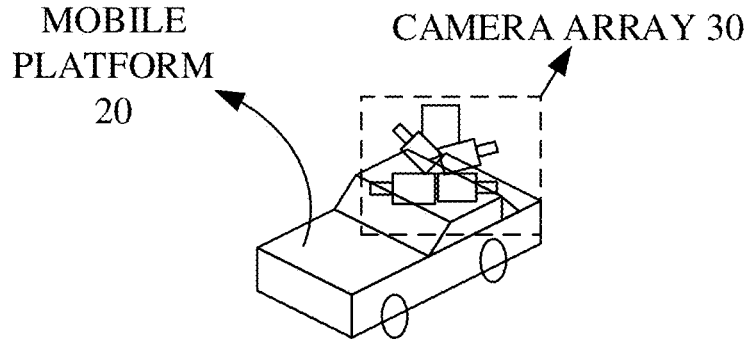
FIG. 1A is a schematic diagram of a system for deformation measurement provided in implementations of the present disclosure.

Reference can be made to FIG. 1A, which is a schematic diagram of a system for deformation measurement provided in implementations of the present disclosure. The system for deformation measurement includes an apparatus 10 for deformation measurement, where the apparatus 10 for deformation measurement includes a mobile platform 20, the mobile platform 20 includes a camera array 30, the camera array 30 includes at least two cameras in an opposite photographing direction, cameras in the camera array 30 are fixedly connected to each other, and the model and focal length of each camera are not limited in the present disclosure.

In implementations of the present disclosure, when the mobile platform 20 moves to a first monitoring position, the mobile platform 20 sends a control signal to the camera array 30. After the camera array 30 receives the control signal, the camera array 30 controls a first camera and a second camera to photograph monitoring points. Then, the apparatus 10 for deformation measurement calculates a vertical subsidence amount and a horizontal displacement amount of each of the monitoring points according to images photographed by the first camera and the second camera.

Exemplarily, when the mobile platform in the apparatus 10 for deformation measurement moves to a first monitoring position in an area to-be-measured, a first image is obtained by photographing, by the first camera in the camera array integrated into the mobile platform, monitoring points in a first area to-be-measured in the area to-be-measured, and a second image is obtained by photographing, by the second camera in the camera array, monitoring points in a second area to-be-measured in the area to-be-measured. The monitoring points in the first area to-be-measured are disposed on one side of the first monitoring position, the monitoring points in the second area to-be-measured are disposed on the other side of the first monitoring position, and the first camera has an opposite photographing direction with the second camera. It can be noted that in implementations of the present disclosure, when the mobile platform in the apparatus 10 for deformation measurement moves to the first monitoring position in the area to-be-measured, the first camera and the second camera in the camera array are simultaneously photographing the monitoring points in the area to-be-measured. In other words, while the first camera is photographing the monitoring points in the first area to-be-measured, the second camera is also photographing the monitoring points in the second area to-be-measured.

Accordingly, when the mobile platform in the apparatus 10 for deformation measurement moves to a second monitoring position in the area to-be-measured, a third image is obtained by photographing, by the first camera, the monitoring points in the first area to-be-measured, and a fourth image is obtained by photographing, by the second camera, the monitoring points in the second area to-be-measured.

Then, $J_1$ first monitoring points are determined according to the first image and the third image, and $J_2$ second monitoring points are determined according to the second image and the fourth image, where $J_1$ first monitoring points are monitoring points included in both the first image and the third image, and the $J_2$ second monitoring points are monitoring points included in both the second image and the fourth image.

Finally, the apparatus 10 for deformation measurement obtains a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image.

Figure 1B:
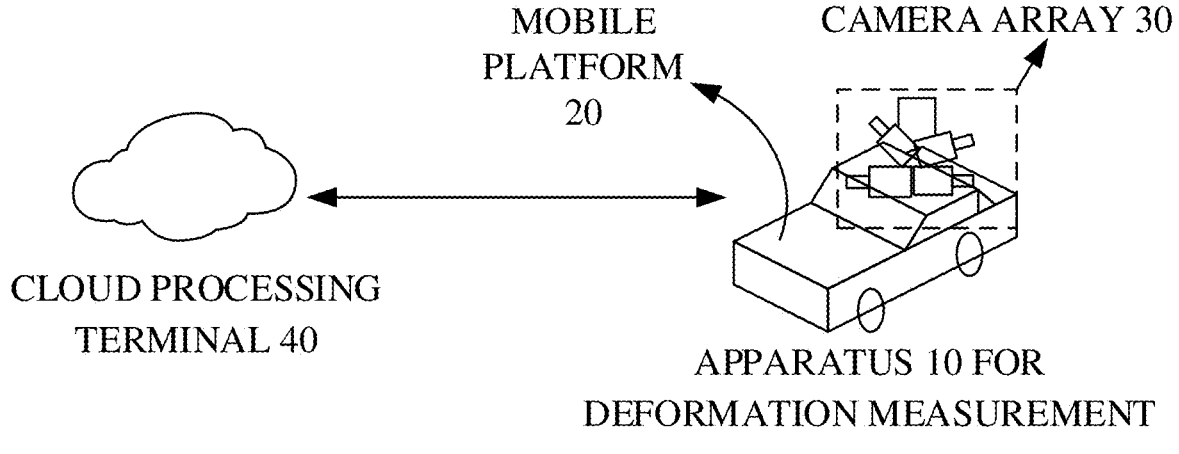
FIG. 1B is a schematic diagram of a system for deformation measurement provided in other implementations of the present disclosure.

Optionally, reference can be made to FIG. 1B, which is a schematic diagram of a system for deformation measurement provided in other implementations of the present disclosure. The system for deformation measurement includes an apparatus 10 for deformation measurement and a cloud processing terminal 40, where the apparatus 10 for deformation measurement includes a mobile platform 20, the mobile platform 20 includes a camera array 30, the camera array 30 includes at least two cameras in an opposite photographing direction, cameras in the camera array 30 are fixedly connected to each other, and the model and focal length of each camera are not limited in the present disclosure.

It can be noted that a method for obtaining the first image, the second image, the third image, and the fourth image by the system for deformation measurement illustrated in FIG. 1B is the same as the method for obtaining the first image, the second image, the third image, and the fourth image by the system for deformation measurement illustrated in FIG. 1A, which is not repeated herein. A difference between the system for deformation measurement illustrated in FIG. 1B and the system for deformation measurement illustrated in FIG. 1A includes the following. After the first image, the second image, the third image, and the fourth image are obtained, the system for deformation measurement illustrated in FIG. 1B sends the first image, the second image, the third image, and the fourth image to the cloud processing terminal 40, and then the cloud processing terminal 40 calculates a vertical subsidence amount and a horizontal displacement amount of each of the monitoring points according to the first image, the second image, the third image, and the fourth image.

Further, in implementations of the present disclosure, the system for deformation measurement illustrated in FIG. 1A or FIG. 1B is applicable to deformation monitoring of large-scale structural engineering such as highways, railroads, bridges, tunnels, etc. For example, multiple monitoring positions are determined in a tunnel, and multiple monitoring points are determined on two sides of each monitoring position. The system for deformation measurement calculates a vertical subsidence amount and a horizontal displacement amount of each of the monitoring points, and then can compare the vertical subsidence amount and the horizontal displacement amount of each of the monitoring points with a first threshold. If the vertical subsidence amount and the horizontal displacement amount of each of the monitoring points are greater than the first threshold, an early warning prompt can be provided to a monitoring center. Optionally, after the vertical subsidence amount and the horizontal displacement amount of each of the monitoring points are calculated, a ratio of the vertical subsidence amount of each of the monitoring points to a time interval between two adjacent tours is taken as a subsidence deformation rate of each of the monitoring points, and a ratio of the horizontal displacement amount of each of the monitoring points to the time interval between two adjacent tours is taken as a horizontal deformation rate of each of the monitoring points. Then the subsidence deformation rate and the horizontal deformation rate of each of the monitoring points are compared with a second threshold. A monitoring point whose subsidence deformation rate and/or horizontal deformation rate are greater than the second threshold is determined as an abnormal monitoring point, and an early warning prompt for the abnormal monitoring point can be provided to the monitoring center, such that the abnormal monitoring point can be repaired. It can be noted that more application scenarios can be involved in actual situations, and the present disclosure does not enumerate them one by one.

As can be seen, in implementations of the present disclosure, when the mobile platform moves to the first monitoring position in the area to-be-measured, the first image is obtained by photographing, by the first camera in the camera array, the monitoring points in the first area to-be-measured in the area to-be-measured, and the second image is obtained by photographing, by the second camera in the camera array, the monitoring points in the second area to-be-measured in the area to-be-measured. In addition, when the mobile platform moves to the second monitoring position in the area to-be-measured, the third image is obtained by photographing, by the first camera, the monitoring points in the first area to-be-measured, and the fourth image is obtained by photographing, by the second camera, the monitoring points in the second area to-be-measured. Then, the $J_1$ first monitoring points are determined according to the first image and the third image, and the $J_2$ second monitoring points are determined according to the second image and the fourth image. Finally, the horizontal displacement amount and the vertical subsidence amount of each of the $J_1$ first monitoring points and the horizontal displacement amount and the vertical subsidence amount of each of the $J_2$ second monitoring points are obtained according to the first image, the second image, the third image, and the fourth image. With the method for measurement based on camera-based mobile networking, cameras are integrated into the mobile platform, and automatic measurement can be achieved without manual intervention during the measurement, thereby saving a lot of labor and material resources, improving the efficiency of measurement, and enhancing the simplicity and flexibility of the measurement system.

Reference can be made to FIG. 2, which is a schematic flowchart of a method for deformation measurement provided in implementations of the present disclosure. The method is applicable to the apparatus 10 for deformation measurement, and the apparatus 10 for deformation measurement includes a camera array and a mobile platform. The method includes, but is not limited to, operations at S201 to S204.

S201, when the mobile platform moves to a first monitoring position in an area to-be-measured, a first image is obtained by photographing, by a first camera in the camera array, monitoring points in a first area to-be-measured in the area to-be-measured, and a second image is obtained by photographing, by a second camera in the camera array, monitoring points in a second area to-be-measured in the area to-be-measured.

The monitoring points in the first area to-be-measured are disposed on one side of the first monitoring position, the monitoring points in the second area to-be-measured are disposed on the other side of the first monitoring position, and the first camera has an opposite photographing direction with the second camera.

In implementations of the present disclosure, the mobile platform can be a mobile monitoring vehicle, a mobile monitoring vessel, a mobile aircraft, etc., and the mobile platform can be installed with a positioning apparatus, such as a mileage encoder, a global positioning system (GPS), etc., or a posture measurement apparatus, such as an inertial navigation system (INS), a gyroscope, etc., which is not limited in the present disclosure.

It can be noted that the camera array refers to multiple cameras fixedly connected to each other, but the photographing direction of each camera can be different, and the model and focal length of each camera can be different, which is not limited in the present disclosure. In implementations of the present disclosure, the camera array includes at least two cameras, and at least one camera has an opposite photographing direction with other cameras. Exemplarily, the camera array includes a first camera and a second camera, and the first camera has the opposite photographing direction with the second camera. For example, the first camera is a rear-view camera, and the second camera is a front-view camera. The rear-view camera refers to a camera whose photographing direction is different from a moving direction of the mobile platform, and the front-view camera refers to a camera whose photographing direction is the same as the moving direction of the mobile platform.

Accordingly, the rear-view camera and the front-view camera photograph markers at the monitoring points during the movement of the mobile platform, i.e., the rear-view camera photographs markers at the monitoring points in the first area to-be-measured, and the front-view camera photographs markers at the monitoring points in the second area to-be-measured. Meanwhile, the apparatus 10 for deformation measurement synchronously records a position at which the mobile platform is located, i.e., the first monitoring position, when cameras are photographing. It can be noted that the position at which the mobile platform is located can be recorded by manual marking, mileage encoder reading, a global positioning system (GPS), etc., which is not limited herein. In addition, the markers at the monitoring points can be natural features of the monitoring points, or can be artificial markers disposed at the monitoring points. which is not limited herein.

S202, when the mobile platform moves to a second monitoring position in the area to-be-measured, a third image is obtained by photographing, by the first camera, the monitoring points in the first area to-be-measured, and a fourth image is obtained by photographing, by the second camera, the monitoring points in the second area to-be-measured.

It can be noted that the first monitoring position in S201 is a position where the first camera in the camera array photographs the monitoring points in the first area to-be-measured and the second camera photographs the monitoring points in the second area to-be-measured in a first tour of the apparatus 10 for deformation measurement from the start to the end. Accordingly, the second monitoring position is a position where the first camera in the camera array photographs the monitoring points in the first area to-be-measured and the second camera photographs the monitoring points in the second area to-be-measured in a second tour of the apparatus 10 for deformation measurement from the start to the end. In this case, considering actual situations, the position where the first camera photographs the monitoring points in the first area to-be-measured and the second camera photographs the monitoring points in the second area to-be-measured in the first tour can be different from the position where the first camera photographs the monitoring points in the first area to-be-measured and the second camera photographs the monitoring points in the second area to-be-measured in the second tour. Therefore, in implementations of the present disclosure, the first monitoring position can be different from the second monitoring position, so that the apparatus for deformation measurement itself generates six-degree-of-freedom movements.

In addition, the monitoring points in the first area to-be-measured and the monitoring points in the second area to-be-measured are set up in the area to-be-measured in accordance with the requirements of a preset measurement specification. For example, both the monitoring points in the first area to-be-measured and the monitoring points in the second area to-be-measured can be set as subsidence measurement points and/or horizontal displacement measurement points. In other words, the subsidence measurement point and the horizontal displacement measurement point can be the same or different. In addition, the position and the shape of the monitoring points are not limited in the present disclosure.

It can be noted that, deformation measurement of large-scale structural engineering can be implemented by one tour or by multiple tours. It can be clarified that, if the deformation measurement is implemented by one tour, the vertical subsidence amount and the horizontal displacement amount of each of the monitoring points obtained in this case are deformation amounts relative to a reference tour. If the deformation measurement is implemented by multiple tours, the multiple tours are two adjacent tours, such as the first tour and the second tour, a time interval between the two adjacent tours is not limited in the present disclosure, and the vertical subsidence amount and the horizontal displacement amount of each of the monitoring points obtained in this case are deformation amounts of the second tour relative to the first tour.

S203, $J_1$ first monitoring points are determined according to the first image and the third image, and $J_2$ second monitoring points are determined according to the second image and the fourth image.

The $J_1$ first monitoring points are monitoring points included in both the first image and the third image, i.e., the $J_1$ first monitoring points are included in the first image, and the $J_1$ first monitoring points are also included in the third image. The $J_2$ second monitoring points are monitoring points included in both the second image and the fourth image, i.e., the $J_2$ second monitoring points are included in the second image, and the $J_2$ second monitoring points are also included in the fourth image.

It can be noted that in actual applications, since the monitoring points can be destroyed, lost, etc. in the tours, the number of monitoring points photographed by the camera in the camera array in the first tour can be different from the number of monitoring points photographed by the camera in the camera array in the second tour. Exemplarily, at the first monitoring position in the first tour, the first image is obtained by photographing, by the first camera, the monitoring points in the first area to-be-measured, and then the number of monitoring points photographed in the first tour can be determined according to the first image. At the second monitoring position in the second tour, the third image is obtained by photographing, by the first camera, the monitoring points in the first area to-be-measured, and then the number of monitoring points photographed in the second tour can be determined according to the third image. If the monitoring points are destroyed, lost, etc. in the second tour, the number of monitoring points photographed in the second tour is less than the number of monitoring points photographed in the first tour. It can also be understood that in this case, the monitoring points in the first image are greater than $J_1$, and the monitoring points in the third image are equal to $J_1$. Therefore, in this case, the monitoring points included in both the first image and the third image, i.e. the $J_1$ first monitoring points, need to be determined. Meanwhile, it can be clarified that if the monitoring points are not destroyed, lost, etc. in the tours, the number of monitoring points in the first image is equal to the number of monitoring points in the third image, and both the number of monitoring points in the first image and the number of monitoring points in the third image are $J_1$. Similarly, for a principle of determining the $J_2$ second monitoring points by photographing, by the second camera, the monitoring points in the second area to-be-measured, reference can be made to the principle of determining the $J_1$ first monitoring points by photographing, by the first camera, the monitoring points in the first area to-be-measured, which is not repeated herein.

S204, a horizontal displacement amount and a vertical subsidence amount of each of the $J_1$ first monitoring points and a horizontal displacement amount and a vertical subsidence amount of each of the $J_2$ second monitoring points are obtained according to the first image, the second image, the third image, and the fourth image.

In implementations of the present disclosure, when the subsidence measurement point and the horizontal displacement measurement point are the same point, i.e., when each of the $J_1$ first monitoring points and the $J_2$ second monitoring points serves as both a subsidence measurement point and a horizontal displacement measurement point, the horizontal displacement amount and the vertical subsidence amount of each of the $J_1$ first monitoring points and the horizontal displacement amount and the vertical subsidence amount of each of the $J_2$ second monitoring points can be obtained according to the first image, the second image, the third image, and the fourth image. As illustrated in FIG. 3, FIG. 3 is a schematic flowchart of illustrating obtainment of a horizontal displacement amount and a vertical subsidence amount of each of $J_1$ first monitoring points and a horizontal displacement amount and a vertical subsidence amount of each of $J_2$ second monitoring points according to a first image, a second image, a third image, a fourth image provided in implementations of the present disclosure. The obtainment includes, but is not limited to, operations at S301 to S305.

S301, $J_1$ first pixel coordinates corresponding to the $J_1$ first monitoring points in the first image are obtained, and $J_1$ second pixel coordinates corresponding to the $J_1$ first monitoring points in the third image are obtained.

The $J_1$ first pixel coordinates are in one-to-one correspondence with the $J_1$ first monitoring points, and the $J_1$ second pixel coordinates are in one-to-one correspondence with the $J_1$ first monitoring points.

Optionally, before a first pixel coordinate and a second pixel coordinate are obtained, the first image and the third image can be preprocessed, such as de-noising and graying, and then the first pixel coordinate and the second pixel coordinate are obtained according to the preprocessed images. It can be noted that obtaining the $J_1$ first pixel coordinates and the $J_1$ second pixel coordinates corresponding to the $J_1$ first monitoring points is to determine positions of the $J_1$ first monitoring points in the first image and the third image. In this case, an image sub-pixel positioning technology can be used for determining the positions of the $J_1$ first monitoring points in the first image and the third image. The image sub-pixel positioning technology can include an adaptive template correlation filtering method, an adaptive threshold barycenter method, a grayscale fitting method, etc., which is not limited in the present disclosure.

S302, for each of the $J_1$ first monitoring points, a first vertical variation and a first horizontal variation corresponding to a first monitoring point are obtained according to a first pixel coordinate and a second pixel coordinate corresponding to the first monitoring point.

The first vertical variation is a vertical variation corresponding to the first monitoring point in the images, i.e., a vertical variation between the first monitoring point in the first image and the first monitoring point in the third image. In addition, the vertical variation can be indicated by a vertical variation between the first pixel coordinate corresponding to the first monitoring point, i.e., $(x_1, y_1)$, and the second pixel coordinate corresponding to the first monitoring point, i.e., $(x_2, y_2)$, in an image coordinate system. In other words, the vertical variation is $(y_1-y_2)$. The first horizontal variation is a horizontal variation corresponding to the first monitoring point in the images, i.e., a horizontal variation between the first monitoring point in the first image and the first monitoring point in the third image. Similarly, the horizontal variation can be indicated by a horizontal variation between the first pixel coordinate corresponding to the first monitoring point and the second pixel coordinate corresponding to the first monitoring point in the image coordinate system. In other words, the horizontal variation is $(x_1, x_2)$.

S303, $J_2$ third pixel coordinates corresponding to the $J_2$ second monitoring points in the second image are obtained, and $J_2$ fourth pixel coordinates corresponding to the $J_2$ second monitoring points in the fourth image are obtained.

The $J_2$ third pixel coordinates are in one-to-one correspondence with the $J_2$ second monitoring points, and the $J_2$ fourth pixel coordinates are in one-to-one correspondence with the $J_2$ second monitoring points.

Optionally, before a third pixel coordinate and a fourth pixel coordinate are obtained, the second image and the fourth image can be preprocessed, such as de-noising and graying, and then the third pixel coordinate and the fourth pixel coordinate are obtained according to the preprocessed images. It can be noted that obtaining the $J_2$ third pixel coordinates and the $J_2$ fourth pixel coordinates corresponding to the $J_2$ second monitoring points is to determine positions of the $J_2$ second monitoring points in the second image and the fourth image. In this case, the image sub-pixel positioning technology can be used for determining the positions of the $J_2$ second monitoring points in the second image and the fourth image, which is not limited in the present disclosure.

S304, for each of the $J_2$ second monitoring points, a second vertical variation and a second horizontal variation corresponding to a second monitoring point are obtained according to a third pixel coordinate and a fourth pixel coordinate corresponding to the second monitoring point.

The second vertical variation is a vertical variation corresponding to the second monitoring point in the images, i.e., a vertical variation between the second monitoring point in the second image and the second monitoring point in the fourth image. The second horizontal variation is a horizontal variation corresponding to the second monitoring point in the images, i.e., a horizontal variation between the second monitoring point in the second image and the second monitoring point in the fourth image. It can be noted that for a method for obtaining the vertical variation and the horizontal variation corresponding to the second monitoring point, reference can be made to the method for obtaining the vertical variation and the horizontal variation corresponding to the first monitoring point, which is not repeated herein.

S305, the horizontal displacement amount and the vertical subsidence amount of each of the $J_1$ first monitoring points and the horizontal displacement amount and the vertical subsidence amount of each of the $J_2$ second monitoring points are determined according to $J_1$ first vertical variations and $J_1$ first horizontal variations corresponding to the $J_1$ first monitoring points, $J_2$ second vertical variations and $J_2$ second horizontal variations corresponding to the $J_2$ second monitoring points, a first angle and a second angle of the camera array, $J_1$ first object space resolution corresponding to the $J_1$ first monitoring points, $J_2$ second object space resolution corresponding to the $J_2$ second monitoring points, $J_1$ first distances, $J_2$ second distances, and six-degree-of-freedom movements of the apparatus for deformation measurement.

The first angle is an angle between an optical axis of the first camera and a horizontal plane, the second angle is an angle between an optical axis of the second camera and the horizontal plane, the $J_1$ first distances are distances between the first camera and each of the $J_1$ first monitoring points respectively, and the $J_2$ second distances are distances between the second camera and each of the $J_2$ second monitoring points respectively. It can be noted that both the $J_1$ first distances and the $J_2$ second distances are obtained by pre-calibration.

Figure 4:
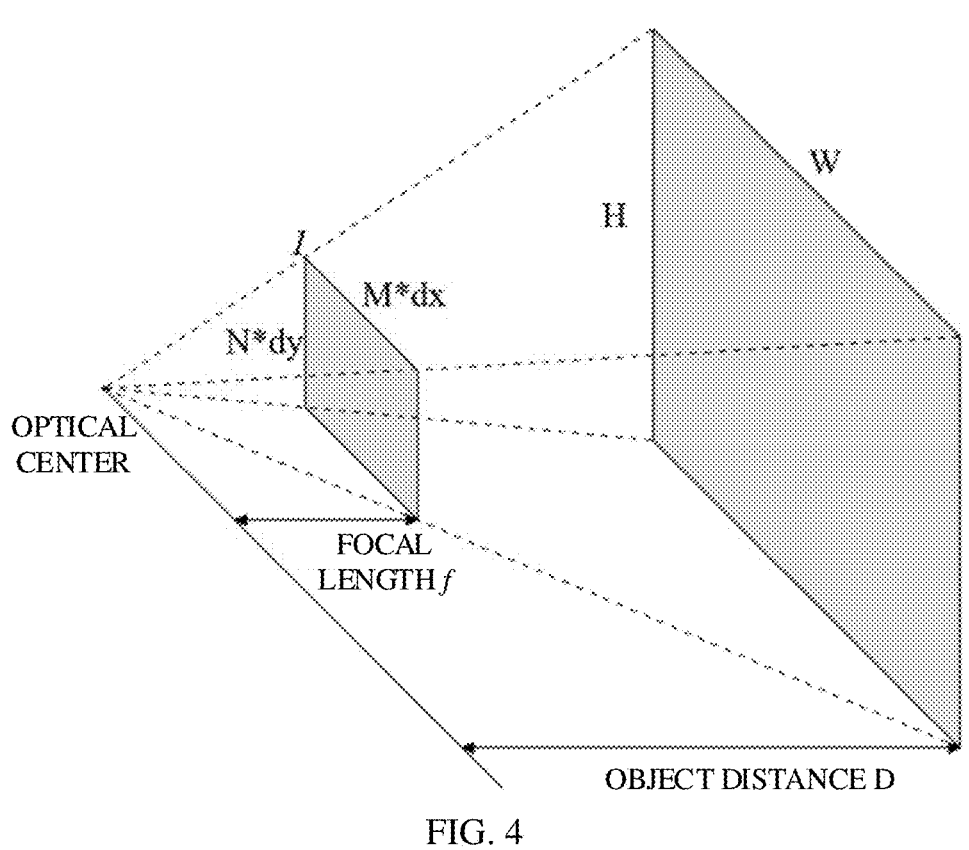
FIG. 4 is a schematic diagram illustrating a basic principle of camera videometrics provided in implementations of the present disclosure.

In addition, the $J_1$ first object space resolution is a magnification of the $J_1$ first monitoring points in the third image, and the $J_2$ second object space resolution is a magnification of the $J_2$ second monitoring points in the fourth image. Exemplarily, as illustrated in FIG. 4, FIG. 4 is a schematic diagram illustrating a basic principle of camera videometrics. Assuming that the size of a photographing field of view is W×H, resolution of the first camera is M×N, the size of a photographic image is dx*dy, a focal length is f, and an object distance is D, then formula (1) can be obtained according to a similarity relationship illustrated in FIG. 4:

$$\frac{f}{D} = \frac{M * dx}{W} = \frac{N * dy}{H} \tag{1}$$

Then the first object space resolution can be obtained according to formula (2) and formula (3):

$$R_x = \frac{D * dx}{f} \tag{2}$$

$$R_y = \frac{D * dy}{f} \tag{3}$$

where both $R_x$ and $R_y$ indicate the first object space resolution. $R_x$ indicates object space resolution of the $J_1$ first monitoring points in the third image in a horizontal direction, and $R_y$ indicates object space resolution of the $J_1$ first monitoring points in the third image in a vertical direction. In other words, the first object space resolution includes the object space resolution in the vertical direction and the object space resolution in the horizontal direction. Therefore, in the following measurement of vertical subsidence amounts of the $J_1$ first monitoring points, the first object space resolution is the object space resolution in the vertical direction, i.e., $R_y$; and in the following measurement of horizontal displacement amounts of the $J_1$ first monitoring points, the first object space resolution is the object space resolution in the horizontal direction.

Similarly, for a method for calculating the second object space resolution, reference can be made to the method for calculating the first object space resolution, which is not repeated herein.

Optionally, in actual applications, a value of the object space resolution can be based on a calibration obtained in the first tour, i.e., an initial tour, can be based on a calibration obtained in any tour, or can be based on an average of values of the object space resolution calibrated in different tours, which is not repeated herein.

Further, in implementations of the present disclosure, operations at S305 specifically include operations at S1-S4 as follows.

S1, for each of the $J_1$ first monitoring points, a first equation set corresponding to a first monitoring point is obtained according to a first vertical variation, a first horizontal variation, a first angle, a first object space resolution, a first distance, and six-degree-of-freedom movements corresponding to the first monitoring point.

In implementations of the present disclosure, if the first monitoring point is the mth first monitoring point among the $J_1$ first monitoring points, the first equation set can be obtained according to formula (4):

$$\begin{cases} h_{S_{i-1,m}}^{C_i} = k_{S_{i-1,m}}^{C_i} \begin{bmatrix} \Delta y_{S_{i-1,m}} - \Delta y_{C_i} - d_{S_{i-1,m}}^{C_i} \cdot \sin \alpha_{C_i} / \cos(\theta_B + \alpha_{C_i}) - \\ \Delta z_{C_i} \cdot \tan \theta_B + d_{S_{i-1,m}}^{C_i} \cdot \sin \theta_B (1 - \cos \beta_{C_i}) - d_{S_{i-1,m}}^{C_i} \cdot \\ \sin \theta_B \cdot (1 - \cos \gamma_{C_i}) / \cos \gamma_{C_i} \end{bmatrix} \\ v_{S_{i-1,m}}^{C_i} = k_{S_{i-1,m}}^{C_i} \begin{bmatrix} -\Delta x_{S_{i-1,m}} + \Delta x_{C_i} + d_{S_{i-1,m}}^{C_i} \cdot \cos \theta_B \cdot \sin \beta_{C_i} - d_{S_{i-1,m}}^{C_i} \cdot \\ \sin \theta_B \cdot \tan \gamma_{C_i} \end{bmatrix} \end{cases} \tag{4}$$

where m is an integer greater than or equal to 1 and less than or equal to $J_1$, $$h_{S_{i-1,m}}^{C_i}$$

is a first vertical variation corresponding to the mth first monitoring point among the $J_1$ first monitoring points, $$v_{S_{i-1,m}}^{C_i}$$

is a first horizontal variation corresponding to the mth first monitoring point, $$k_{S_{i-1,m}}^{C_i}$$

is a first object space resolution corresponding to the mth first monitoring point, $\theta_B$ is a first angle, $$d_{S_{i-1,m}}^{C_i}$$

is a first distance, $\Delta y_{S_{i-1,m}}$ is a vertical subsidence amount of the mth first monitoring point, $\Delta x_{S_{i-1,m}}$ is a horizontal displacement amount of the mth first monitoring point, and $\Delta y_{C_i}$, $\gamma_{C_i}$, $\Delta z_{C_i}$, $\Delta x_{C_i}$, $\alpha_{C_i}$, and $\beta_{C_i}$ are six-degree-of-freedom movements. In addition, $\Delta y_{C_i}$ is a subsidence amount of the apparatus 10 for deformation measurement, $\gamma_{C_i}$ is a roll variation amount of the apparatus 10 for deformation measurement, $\Delta z_{C_i}$ is a longitudinal displacement amount of the apparatus 10 for deformation measurement in a moving direction, $\Delta x_{C_i}$ is a horizontal displacement amount of the apparatus 10 for deformation measurement, $\alpha_{C_i}$ is a pitch angle variation corresponding to the apparatus 10 for deformation measurement, and $\beta_{C_i}$ is a yaw variation corresponding to the apparatus 10 for deformation measurement.

S2: for each of $J_2$ second monitoring points, a second equation set corresponding to a second monitoring point is obtained according to a second vertical variation, a second horizontal variation, a second angle, a second object space resolution, a second distance, and six-degree-of-freedom movements corresponding to the second monitoring point.

In implementations of the present disclosure, if the second monitoring point is the nth second monitoring point among the $J_2$ second monitoring points, the second equation set can be obtained according to formula (5):

$$\begin{cases} h_{S_{i,n}}^{C_i} = k_{S_{i,n}}^{C_i} \begin{bmatrix} \Delta y_{S_{i,n}} - \Delta y_{C_i} + d_{S_{i,n}}^{C_i} \cdot \sin \alpha_{C_i} / \cos(\theta_F + \alpha_{C_i}) + \\ \Delta z_{C_i} \cdot \tan \theta_F + d_{S_{i,n}}^{C_i} \cdot \sin \theta_F (1 - \cos \beta_{C_i}) - d_{S_{i,n}}^{C_i} \cdot \\ \sin \theta_F \cdot (1 - \cos \gamma_{C_i}) / \cos \gamma_{C_i} \end{bmatrix} \\ v_{S_{i,n}}^{C_i} = k_{S_{i,n}}^{C_i} \begin{bmatrix} \Delta x_{S_{i,n}} - \Delta x_{C_i} + d_{S_{i,n}}^{C_i} \cdot \cos \theta_F \cdot \sin \beta_{C_i} - d_{S_{i,n}}^{C_i} \cdot \\ \sin \theta_F \cdot \tan \gamma_{C_i} \end{bmatrix} \end{cases} \tag{5}$$

where n is an integer greater than or equal to 1 and less than or equal to $J_2$, $$h_{S_{i,n}}^{C_i}$$

is a second vertical variation corresponding to the nth second monitoring point among the $J_2$ second monitoring points, $$v_{S_{i,n}}^{C_i}$$

is a second horizontal variation corresponding to the nth second monitoring point among the $J_2$ second monitoring points, $$k_{S_{i,n}}^{C_i}$$

is a second object space resolution corresponding to the nth second monitoring point, $\theta_F$ is a second angle, $$d_{S_{i,n}}^{C_i}$$

is a second distance, $\Delta y_{S_{i,n}}$ is a vertical subsidence amount of the nth second monitoring point, $\Delta x_{S_{i,n}}$ is a horizontal displacement amount of the nth second monitoring point, and $\Delta y_{C_i}$, $\gamma_{C_i}$, $\Delta z_{C_i}$, $\Delta x_{C_i}$, $\alpha_{C_i}$, and $\beta_{C_i}$ are six-degree-of-freedom movements. In addition, $\Delta y_{C_i}$ is the subsidence amount of the apparatus 10 for deformation measurement, $\gamma_{C_i}$ is the roll variation amount of the apparatus 10 for deformation measurement, $\Delta z_{C_i}$ is the longitudinal displacement amount of the apparatus 10 for deformation measurement in the moving direction, $\Delta x_{C_i}$ is the horizontal displacement amount of the apparatus 10 for deformation measurement, $\alpha_{C_i}$ is the pitch angle variation corresponding to the apparatus 10 for deformation measurement, and $\beta_{C_i}$ is the yaw variation corresponding to the apparatus 10 for deformation measurement.

S3, a first target equation set and a second target equation set are obtained according to $J_1$ first equation sets corresponding to the $J_1$ first monitoring points and $J_2$ second equation sets corresponding to the $J_2$ second monitoring points.

In implementations of the present disclosure, the first target equation set is obtained by combining a first sub-equation in each of the $J_1$ first equation sets with a first sub-equation in each of the $J_2$ second equation sets. For example, the first target equation set is obtained by combining a first sub-equation in the mth first equation set $$h_{S_{i-1,m}}^{C_i} = k_{S_{i-1,m}}^{C_i} \begin{bmatrix} \Delta y_{S_{i-1,m}} - \Delta y_{C_i} - d_{S_{i-1,m}}^{C_i} \cdot \sin\alpha_{C_i} \big/ \cos\big(\theta_B + \alpha_{C_i}\big) - \\ \Delta z_{C_i} \cdot \tan\theta_B + d_{S_{i-1,m}}^{C_i} \cdot \sin\theta_B\big(1 - \cos\beta_{C_i}\big) - d_{S_{i-1,m}}^{C_i} \cdot \\ \sin\theta_B \cdot \big(1 - \cos\gamma_{C_i}\big) \big/ \cos\gamma_{C_i} \end{bmatrix}$$

with a first sub-equation in the nth first equation set $$h_{S_{i,n}}^{C_i} = k_{S_{i,n}}^{C_i} \begin{bmatrix} \Delta y_{S_{i,n}} - \Delta y_{C_i} + d_{S_{i,n}}^{C_i} \cdot \sin\alpha_{C_i} \big/ \cos\big(\theta_F + \alpha_{C_i}\big) + \Delta z_{C_i} \cdot \tan\theta_F + \\ d_{S_{i,n}}^{C_i} \cdot \sin\theta_F\big(1 - \cos\beta_{C_i}\big) - d_{S_{i,n}}^{C_i} \cdot \sin\theta_F \cdot \big(1 - \cos\gamma_{C_i}\big) \big/ \cos\gamma_{C_i} \end{bmatrix}.$$

Exemplarily, the first target equation set can be obtained according to formula (6):

$$\begin{cases} h_{S_{i-1,1}}^{C_i} = k_{S_{i-1,1}}^{C_i} \begin{bmatrix} \Delta y_{S_{i-1,1}} - \Delta y_{C_i} - d_{S_{i-1,1}}^{C_i} \cdot \sin\alpha_{C_i} \big/ \cos\big(\theta_B + \alpha_{C_i}\big) - \\ \Delta z_{C_i} \cdot \tan\theta_B + d_{S_{i-1,1}}^{C_i} \cdot \sin\theta_B\big(1 - \cos\beta_{C_i}\big) - d_{S_{i-1,1}}^{C_i} \cdot \\ \sin\theta_B \cdot \big(1 - \cos\gamma_{C_i}\big) \big/ \cos\gamma_{C_i} \end{bmatrix} \\[4mm] h_{S_{i-1,2}}^{C_i} = k_{S_{i-1,2}}^{C_i} \begin{bmatrix} \Delta y_{S_{i-1,2}} - \Delta y_{C_i} - d_{S_{i-1,2}}^{C_i} \cdot \sin\alpha_{C_i} \big/ \cos\big(\theta_B + \alpha_{C_i}\big) - \\ \Delta z_{C_i} \cdot \tan\theta_B + d_{S_{i-1,2}}^{C_i} \cdot \sin\theta_B\big(1 - \cos\beta_{C_i}\big) - d_{S_{i-1,2}}^{C_i} \cdot \\ \sin\theta_B \cdot \big(1 - \cos\gamma_{C_i}\big) \big/ \cos\gamma_{C_i} \end{bmatrix} \\[2mm] \vdots \\[2mm] h_{S_{i-1,J_1}}^{C_i} = k_{S_{i-1,J_1}}^{C_i} \begin{bmatrix} \Delta y_{S_{i-1,J_1}} - \Delta y_{C_i} - d_{S_{i-1,J_1}}^{C_i} \cdot \sin\alpha_{C_i} \big/ \cos\big(\theta_B + \alpha_{C_i}\big) - \\ \Delta z_{C_i} \cdot \tan\theta_B + d_{S_{i-1,J_1}}^{C_i} \cdot \sin\theta_B\big(1 - \cos\beta_{C_i}\big) - d_{S_{i-1,J_1}}^{C_i} \cdot \\ \sin\theta_B \cdot \big(1 - \cos\gamma_{C_i}\big) \big/ \cos\gamma_{C_i} \end{bmatrix} \\[4mm] h_{S_{i,1}}^{C_i} = k_{S_{i,1}}^{C_i} \begin{bmatrix} \Delta y_{S_{i,1}} - \Delta y_{C_i} + d_{S_{i,1}}^{C_i} \cdot \sin\alpha_{C_i} \big/ \cos\big(\theta_F + \alpha_{C_i}\big) + \\ \Delta z_{C_i} \cdot \tan\theta_F + d_{S_{i,1}}^{C_i} \cdot \sin\theta_F\big(1 - \cos\beta_{C_i}\big) - d_{S_{i,1}}^{C_i} \cdot \\ \sin\theta_F \cdot \big(1 - \cos\gamma_{C_i}\big) \big/ \cos\gamma_{C_i} \end{bmatrix} \\[4mm] h_{S_{i,2}}^{C_i} = k_{S_{i,2}}^{C_i} \begin{bmatrix} \Delta y_{S_{i,2}} - \Delta y_{C_i} + d_{S_{i,2}}^{C_i} \cdot \sin\alpha_{C_i} \big/ \cos\big(\theta_F + \alpha_{C_i}\big) + \\ \Delta z_{C_i} \cdot \tan\theta_F + d_{S_{i,2}}^{C_i} \cdot \sin\theta_F\big(1 - \cos\beta_{C_i}\big) - d_{S_{i,2}}^{C_i} \cdot \\ \sin\theta_F \cdot \big(1 - \cos\gamma_{C_i}\big) \big/ \cos\gamma_{C_i} \end{bmatrix} \\[2mm] \vdots \\[2mm] h_{S_{i,J_2}}^{C_i} = k_{S_{i,J_2}}^{C_i} \begin{bmatrix} \Delta y_{S_{i,J_2}} - \Delta y_{C_i} + d_{S_{i,J_2}}^{C_i} \cdot \sin\alpha_{C_i} \big/ \cos\big(\theta_F + \alpha_{C_i}\big) + \\ \Delta z_{C_i} \cdot \tan\theta_F + d_{S_{i,J_2}}^{C_i} \cdot \sin\theta_F\big(1 - \cos\beta_{C_i}\big) - d_{S_{i,J_2}}^{C_i} \cdot \\ \sin\theta_F \cdot \big(1 - \cos\gamma_{C_i}\big) \big/ \cos\gamma_{C_i} \end{bmatrix} \end{cases} \tag{6}$$

The second target equation set is obtained by combining a second sub-equation in each of the $J_1$ first equation sets with a second sub-equation in each of the $J_2$ second equation sets. For example, the second target equation set is obtained by combining a second sub-equation in the mth first equation set $$v_{S_{i-1,m}}^{C_i} = k_{S_{i-1,m}}^{C_i} \left[ -\Delta x_{S_{i-1,m}} + \Delta x_{C_i} + d_{S_{i-1,m}}^{C_i} \cdot \cos\theta_B \cdot \sin\beta_{C_i} - d_{S_{i-1,m}}^{C_i} \cdot \sin\theta_B \cdot \tan\gamma_{C_i} \right]$$

with a second sub-equation in the nth first equation set $$v_{S_{i,n}}^{C_i} = k_{S_{i,n}}^{C_i} \left[ \Delta x_{S_{i,n}} - \Delta x_{C_i} + d_{S_{i,n}}^{C_i} \cdot \cos\theta_F \cdot \sin\beta_{C_i} - d_{S_{i,n}}^{C_i} \cdot \sin\theta_F \cdot \tan\gamma_{C_i} \right].$$

Exemplarily, the second target equation set can be obtained according to formula (7):

$$\begin{cases} v_{S_{i-1,1}}^{C_i} = k_{S_{i-1,1}}^{C_i} \begin{bmatrix} -\Delta x_{S_{i-1,1}} + \Delta x_{C_i} + d_{S_{i-1,1}}^{C_i} \cdot \cos\theta_B \cdot \\ \sin\beta_{C_i} - d_{S_{i-1,1}}^{C_i} \cdot \sin\theta_B \cdot \tan\gamma_{C_i} \end{bmatrix} \\ v_{S_{i-1,2}}^{C_i} = k_{S_{i-1,2}}^{C_i} \begin{bmatrix} -\Delta x_{S_{i-1,2}} + \Delta x_{C_i} + d_{S_{i-1,2}}^{C_i} \cdot \cos\theta_B \cdot \\ \sin\beta_{C_i} - d_{S_{i-1,2}}^{C_i} \cdot \sin\theta_B \cdot \tan\gamma_{C_i} \end{bmatrix} \\ \vdots \\ v_{S_{i-1,J_1}}^{C_i} = k_{S_{i-1,J_1}}^{C_i} \begin{bmatrix} -\Delta x_{S_{i-1,J_1}} + \Delta x_{C_i} + d_{S_{i-1,J_1}}^{C_i} \cdot \cos\theta_B \cdot \\ \sin\beta_{C_i} - d_{S_{i-1,J_1}}^{C_i} \cdot \sin\theta_B \cdot \tan\gamma_{C_i} \end{bmatrix} \\ v_{S_{i,1}}^{C_i} = k_{S_{i,1}}^{C_i} \begin{bmatrix} \Delta x_{S_{i,1}} - \Delta x_{C_i} + d_{S_{i,1}}^{C_i} \cdot \cos\theta_F \cdot \\ \sin\beta_{C_i} - d_{S_{i,1}}^{C_i} \cdot \sin\theta_F \cdot \tan\gamma_{C_i} \end{bmatrix} \\ v_{S_{i,2}}^{C_i} = k_{S_{i,2}}^{C_i} \begin{bmatrix} \Delta x_{S_{i,2}} - \Delta x_{C_i} + d_{S_{i,2}}^{C_i} \cdot \cos\theta_F \cdot \\ \sin\beta_{C_i} - d_{S_{i,2}}^{C_i} \cdot \sin\theta_F \cdot \tan\gamma_{C_i} \end{bmatrix} \\ \vdots \\ v_{S_{i,J_2}}^{C_i} = k_{S_{i,J_2}}^{C_i} \begin{bmatrix} \Delta x_{S_{i,J_2}} - \Delta x_{C_i} + d_{S_{i,J_2}}^{C_i} \cdot \cos\theta_F \cdot \\ \sin\beta_{C_i} - d_{S_{i,J_2}}^{C_i} \cdot \sin\theta_F \cdot \tan\gamma_{C_i} \end{bmatrix} \end{cases} \tag{7}$$

S4, the vertical subsidence amount of each of the $J_1$ first monitoring points and the vertical subsidence amount of each of the $J_2$ second monitoring points are obtained according to the first target equation set; and the horizontal displacement amount of each of the $J_1$ first monitoring points and the horizontal displacement amount of each of the $J_2$ second monitoring points are obtained according to the second target equation set.

In implementations of the present disclosure, in order to obtain the vertical subsidence amount of each of the $J_1$ first monitoring points and the vertical subsidence amount of each of the $J_2$ second monitoring points according to the first target equation set, the first target equation set needs to have a solution. In order to obtain the horizontal displacement amount of each of the $J_1$ first monitoring points and the horizontal displacement amount of each of the $J_2$ second monitoring points according to the second target equation set, the second target equation set also needs to have a solution.

It can be noted that when the first camera photographs points to-be-measured in the first area to-be-measured to obtain the $J_1$ first monitoring points and the second camera photographs points to-be-measured in the second area to-bemeasured to obtain the $J_2$ second monitoring points, both the obtained first target equation set and the obtained second target equation set need to satisfy two basic constraints and one optimization constraint. The two basic constraints include a fixation constraint and a homologous constraint. The fixation constraint refers that the camera array is fixed on the mobile platform, and all cameras in the camera array on the apparatus 10 for deformation measurement have the same six-degree-of-freedom movements at the same monitoring position. For example, the first camera and the second camera on the apparatus 10 for deformation measurement have the same six-degree-of-freedom movements at the second monitoring position. The homonymous constraint refers that when a first monitoring point or a second monitoring point is photographed by different cameras, i.e., when the first monitoring point is photographed by cameras besides the first camera and the second monitoring point is photographed by cameras besides the second camera, vertical subsidence amounts of the first monitoring point are the same physical amount, vertical subsidence amounts of the second monitoring point are the same physical amount, horizontal displacement amounts of the first monitoring point are the same physical amount, and horizontal displacement amounts of the second monitoring point are the same physical amount. For example, in the same tour, a second monitoring point is photographed by the second camera at one first monitoring position and by the first camera at another first monitoring position, then vertical subsidence amounts of the second monitoring point photographed by the first camera and the second camera are the same, and horizontal displacement amounts of the second monitoring point photographed by the first camera and the second camera are also the same. If the homonymous constraint is to be satisfied, optionally, it can be assumed that in a tour, i.e., when the mobile platform is moving from the start to the end, all monitoring points in the area to-be-measured no longer deform after being photographed by any camera in the camera array, which is not limited in the present disclosure. Exemplarily, the $J_2$ second monitoring points no longer deform after being photographed by the second camera, such that vertical subsidence amounts of the $J_2$ second monitoring points photographed by the first camera are the same as vertical subsidence amounts of the $J_2$ second monitoring points photographed by the second camera. The optimization constraint refers that when the mobile platform is moving and the cameras in the camera array are continuously and synchronously photographing, i.e., the first camera and the second camera are continuously and synchronously photographing, a first monitoring point or a second monitoring point can be imaged and measured multiple times to obtain vertical subsidence amounts and horizontal displacement amounts of the first monitoring point or the second monitoring point, so that adjustment optimization can be performed.

Further, according to the first target equation set and the second target equation set, two separate equations can be obtained when each of the $J_1$ first monitoring points or each of the $J_2$ second monitoring points is photographed and imaged each time. In actual applications, as mentioned above, deformation measurement of large-scale structural engineering can be implemented by one tour or by multiple tours. In each tour, i.e., when the mobile platform is moving from the start to the end, there can be multiple monitoring positions. Therefore, if the deformation measurement is implemented by one tour, the vertical subsidence amount and the horizontal displacement amount of each of the monitoring points can be obtained by comparing images photographed at each of the monitoring positions in the tour with images photographed at each corresponding monitoring position in the reference tour. If the deformation measurement is implemented by multiple tours, such as the first tour and the second tour, the vertical subsidence amount and the horizontal displacement amount of each of the monitoring points can be obtained by comparing images photographed at each of the monitoring positions in the second tour with the images photographed at each corresponding monitoring position in the first tour. In implementations of the present disclosure, for illustrative purposes, the deformation measurement is implemented by multiple tours. In other words, the first image and the second image are obtained by photographing, by the first camera and the second camera, at the first monitoring position in the first tour, and the third image and the fourth image are obtained by photographing, by the first camera and the second camera, at the second monitoring position in the second tour. Then vertical subsidence amounts and horizontal displacement amounts of the $J_1$ first monitoring points are obtained by comparing the first image and the third image, and vertical subsidence amounts and horizontal displacement amounts of the $J_2$ second monitoring points are obtained by comparing the second image and the fourth image.

Based on this, in the present disclosure, multiple first monitoring positions are taken as examples to illustrate whether multiple first target equation sets and multiple second target equation sets corresponding to the multiple first monitoring positions each have a solution. Assuming that the number of first monitoring positions is a, the total number of markers is E, i.e., the total number of monitoring points is E, the total numbers of markers photographed at a first monitoring positions are $G_1$, $G_2$, $G_3$ . . . . $G_a$, respectively, and the number of markers (denoted as "homonymous markers") photographed by more than one camera is $L=G_1+G_2+G_3+ . . . G_a-E$, then the number of separate equations is $(G_1+G_2+G_3+ . . . G_a)*2$, and the number of unknown parameters in the equation sets is $2*E+6*a$, i.e., including vertical subsidence amounts of E markers, horizontal displacement amounts of/markers, and 6a six-degree-of-freedom movements of the apparatus for deformation measurement. Therefore, in order to ensure that the equation sets each have a solution, "the number of separate equations≥the number of unknown parameters" needs to be satisfied, i.e., $(G_1+G_2+G_3+ . . . G_a)*2≥(2*E+6*a)$ needs to be satisfied, that is, $L≥3a$. In other words, when $L≥3a$ is satisfied, the unknown parameters in the equation sets can be solved, i.e., the vertical subsidence amounts and the horizontal displacement amounts of the E monitoring points and the six-degree-of-freedom movements of the apparatus for deformation measurement can be obtained.

It can be noted that the unknown parameters solved are relative variations. If absolute vertical subsidence amounts and absolute horizontal displacement amounts of all monitoring points or vertical subsidence amounts and horizontal displacement amounts of all monitoring points relative to reference points need to be obtained, any three reference points or three monitoring points with known vertical subsidence amounts and known horizontal displacement amounts need to be set on a whole monitoring route from the start to the end. In this case, when any camera in the camera array photographs any reference point or any monitoring point with the known vertical subsidence amount and the known horizontal displacement amount, two separate equations can be obtained. In other words, taking the above assumption as an example, the total number of monitoring points is E, then the E monitoring points need to include three reference points or three monitoring points with the known vertical subsidence amounts and the known horizontal displacement amounts, and specific locations of the three reference points or three monitoring points with the known vertical subsidence amounts and horizontal displacement amounts are not limited in the present disclosure. Alternatively, for illustrative purposes, in the present disclosure, there is only one monitoring position, i.e., the first monitoring position, in the first tour, monitoring points in the first area to-be-measured are disposed on one side of the first monitoring position, and monitoring points in the second area to-be-measured are disposed on the other side of the first monitoring position. If both the monitoring points in the first area to-be-measured and the monitoring points in the second area to-be-measured are not destroyed, lost, etc., i.e., both the monitoring points in the first area to-be-measured in the first tour and the monitoring points in the first area to-be-measured in the second tour are the $J_1$ first monitoring points and both the monitoring points in the second area to-be-measured in the first tour and the monitoring points in the second area to-be-measured in the second tour are the $J_2$ second monitoring points, the total number of monitoring points is $(J_1+J_2)$. In other words, the $(J_1+J_2)$ monitoring points need to include three reference points or three monitoring points with the known vertical subsidence amounts and the known horizontal displacement amounts.

Whether the multiple first target equation sets and the multiple second target equation sets corresponding to the multiple first monitoring positions each have a solution is illustrated under a premise that the six-degree-of-freedom movements are all unknown parameters. However, in implementations of the present disclosure, in conjunction with an actual engineering environment, any one or more of the six-degree-of-freedom movements can be used as known parameters but not unknown parameters, so that the number of unknown parameters in the first target equation set and the second target equation set is reduced. Exemplarily, if the mobile platform is a tracked monitoring vehicle, the roll variation $\gamma_{C_i}$ in the six-degree-of-freedom movements of the apparatus 10 for deformation measurement is not an unknown parameter. Therefore, it can be understood that the influence of the roll variation $\gamma_{C_i}$ is negligible, and only five-degree-of-freedom movements of the six-degree-of-freedom movements of the apparatus 10 for deformation measurement are unknown parameters, so that the number of unknown parameters in the first target equation set and the second target equation set is reduced. Alternatively, if the mobile platform is equipped with a positioning apparatus, $\Delta y_{C_i}$, $\Delta z_{C_i}$, and $\Delta x_{C_i}$ in the six-degree-of-freedom movements of the apparatus 10 for deformation measurement can be obtained by the positioning apparatus. In other words, in this case, $\Delta y_{C_i}$, $\Delta z_{C_i}$, and $\Delta x_{C_i}$ are known parameters but not unknown parameters, and only three-degree-of-freedom movements in the six-degree-of-freedom movements of the apparatus 10 for deformation measurement are unknown parameters, so that the number of unknown parameters in the first target equation set and the second target equation set is reduced. Alternatively, if the mobile platform is equipped with a posture measurement apparatus, $\gamma_{C_i}$, $\alpha_{C_i}$, and $\beta_{C_i}$ in the six-degree-of-freedom movements of the apparatus 10 for deformation measurement can be obtained by the posture measurement apparatus. In other words, in this case, $\gamma_{C_i}$, $\alpha_{C_i}$, and $\beta_{C_i}$ are known parameters but not unknown parameters, and only three-degree-of-freedom movements in the six-degree-of-freedom movements of the apparatus 10 for deformation measurement are unknown parameters, so that the number of unknown parameters in the first target equation set and the second target equation set is reduced. It can be noted that the number of degree-of-freedom movements in the six-degree-of-freedom movements as known parameters is not limited in the present disclosure; or whether the mobile platform is equipped with both the positioning apparatus and the posture measurement apparatus, whether the mobile platform is equipped with only the positioning device, or whether the mobile platform is equipped with only the posture measurement apparatus, etc., are not limited in the present disclosure. Meanwhile, it can be noted that corresponding degree-of-freedom movements in the six-degree-of-freedom movements change from unknown parameters to known parameters because the mobile platform is equipped with the positioning apparatus, the posture measurement apparatus, etc., and the corresponding degree-of-freedom movements in the six-degree-of-freedom movements can also change from unknown parameters to known parameters in other methods, which is not listed herein.

Based on this, a principle of illustrating whether the multiple first target equation sets and the multiple second target equation sets corresponding to the multiple first monitoring points each have a solution when one or more of the six-degree-of-freedom movements changes from unknown parameters to known parameters, reference can be made to the principle of illustrating whether the multiple first target equation sets and the multiple second target equation sets corresponding to the multiple first monitoring points each have a solution when all the six-degree-of-freedom movements are unknown parameters, which is not repeated herein.

Reference can be made to FIG. 5, which is a schematic flowchart of a method for deformation measurement provided in other implementations of the present disclosure. The method includes, but is not limited to, operations at S501 to S504.

S501, the number of $J_1$ first monitoring points is even, and the $J_1$ first monitoring points include $J_1/2$ third monitoring points and $J_1/2$ fourth monitoring points.

It can be noted that in implementations of the present disclosure, the number of $J_1$ first monitoring points is even, and the $J_1$ first monitoring points include $J_1/2$ third monitoring points and $J_1/2$ fourth monitoring points. In other words, the $J_1$ first monitoring points include $J_1/2$ subsidence measurement points and $J_1/2$ horizontal displacement measurement points, and all the $J_1/2$ third monitoring points are horizontal displacement measurement points and all the $J_1/2$ fourth monitoring points are subsidence measurement points. Therefore, the subsidence measurement points are different from the horizontal displacement measurement points.

S502, the number of $J_2$ second monitoring points is even, and the $J_2$ second monitoring points include $J_2/2$ fifth monitoring points and $J_2/2$ sixth monitoring points.

It should be noted that in implementations of the present disclosure, the number of $J_2$ second monitoring points is even, and the $J_2$ second monitoring points include $J_2/2$ fifth monitoring points and $J_2/2$ sixth monitoring points. In other words, the $J_2$ second monitoring points include $J_2/2$ subsidence measurement points and $J_2/2$ horizontal displacement measurement points, and all the $J_2/2$ fifth monitoring points are horizontal displacement measurement points and all the $J_2/2$ sixth monitoring points are subsidence measurement points. Therefore, the subsidence measurement points are different from the horizontal displacement measurement points.

S503, a horizontal displacement amount of each of the $J_1/2$ third monitoring points and a horizontal displacement amount of each of the $J_2/2$ fifth monitoring points are obtained according to a first image, a second image, a third image, and a fourth image.

In implementations of the present disclosure, the operations at S503 include, but are not limited to, operations at A1 to A4.

A1, $J_1/2$ fifth pixel coordinates corresponding to the $J_1/2$ third monitoring points in the first image and $J_1/2$ sixth pixel coordinates corresponding to the $J_1/2$ third monitoring points in the third image are obtained.

The $J_1/2$ fifth pixel coordinates are in one-to-one correspondence with the $J_1/2$ third monitoring points, and the $J_1/2$ sixth pixel coordinates are in one-to-one correspondence with the $J_1/2$ third monitoring points.

Optionally, before a fifth pixel coordinate and a sixth pixel coordinate are obtained, the first image and the third image can be preprocessed, such as de-noising and graying, and then the fifth pixel coordinate and the sixth pixel coordinate are obtained according to the preprocessed images. It can be noted that obtaining the $J_1/2$ fifth pixel coordinates and the $J_1/2$ sixth pixel coordinates corresponding to the $J_1/2$ third monitoring points is to determine positions of the $J_1/2$ third monitoring points in the first image and the third image. In this case, an image sub-pixel positioning technology can be used for determining the positions of the $J_1/2$ third monitoring points in the first image and the third image.

A2, $J_2/2$ seventh pixel coordinates corresponding to the $J_2/2$ fifth monitoring points in the second image and $J_2/2$ eighth pixel coordinates corresponding to the $J_2/2$ fifth monitoring points in the fourth image are obtained.

The $J_2/2$ seventh pixel coordinates are in one-to-one correspondence with the $J_2/2$ fifth monitoring points, and the $J_2/2$ eighth pixel coordinates are in one-to-one correspondence with the $J_2/2$ fifth monitoring points.

A3, for each of the $J_1/2$ third monitoring points, a third horizontal variation corresponding to a third monitoring point is obtained according to a fifth pixel coordinate and a sixth pixel coordinate corresponding to the third monitoring point; and for each of the $J_2/2$ fifth monitoring points, a fourth horizontal variation corresponding to a fifth monitoring point is obtained according to a seventh pixel coordinate and an eighth pixel coordinate corresponding to the fifth monitoring point.

The third horizontal variation is a horizontal variation corresponding to the third monitoring point in the images, i.e., a horizontal variation between the third monitoring point in the first image and the third monitoring point in the third image. The fourth horizontal variation is a horizontal variation corresponding to the fifth monitoring point in the images, i.e., a horizontal variation between the fifth monitoring point in the second image and the fifth monitoring point in the fourth image. For a method for obtaining the horizontal variation corresponding to the third monitoring point and the horizontal variation corresponding to the fifth monitoring point, reference can be made to the method for obtaining the horizontal variation corresponding to the first monitoring point, which is not repeated herein.

A4, the horizontal displacement amount of each of the $J_1/2$ third monitoring points and the horizontal displacement amount of each of the $J_2/2$ fifth monitoring points are determined according to $J_1/2$ third horizontal variations corresponding to the $J_1/2$ third monitoring points, $J_2/2$ fourth horizontal variations corresponding to the $J_2/2$ fifth monitoring points, a first angle and a second angle of a camera array, $J_1/2$ third object space resolution corresponding to the $J_1/2$ third monitoring points, $J_2/2$ fourth object space resolution corresponding to the $J_2/2$ fifth monitoring points, $J_1/2$ third distances, $J_2/2$ fourth distances, and three-degree-of-freedom movements of the apparatus for deformation measurement.

The $J_1/2$ third distances are distances between the first camera and each of the $J_1/2$ third monitoring points respectively, and the $J_2/2$ fourth distances are distances between the second camera and each of the $J_2/2$ fifth monitoring points respectively. It can be noted that both $J_1/2$ third distances and $J_2/2$ fourth distances are obtained by pre-calibration.

In addition, the $J_1/2$ third object space resolution is a magnification of the $J_1/2$ third monitoring points in the third image, and the $J_2/2$ fourth object space resolution is a magnification of the $J_2/2$ fifth monitoring points in the fourth image.

Further, in implementations of the present disclosure, the operations at A4 include, but are not limited to, operations at B1 to B4.

B1, for each of the $J_1/2$ third monitoring points, a first equation corresponding to a third monitoring point is obtained according to a third horizontal variation, a third object space resolution, a third distance, a first angle, and three-degree-of-freedom movements corresponding to the third monitoring point.

In implementations of the present disclosure, if the third monitoring point is the Qth third monitoring point among the $J_1/2$ third monitoring points, the first equation can be obtained according to formula (8):

$$v_{P_{i-1,Q}}^{C_i} = k_{P_{i-1,Q}}^{C_i} * \tag{8}$$

$$\left[ -\Delta x_{P_{i-1,Q}} + \Delta x_{C_i} + d_{P_{i-1,Q}}^{C_i} * \cos\theta_B * \sin\beta_{C_i} - d_{P_{i-1,Q}}^{C_i} * \sin\theta_B * \tan\gamma_{C_i} \right]$$

where Q is an integer greater than or equal to 1 and less than or equal to $J_1/2$, $$v_{P_{i-1,Q}}^{C_i}$$

is a third horizontal variation corresponding to the Qth third monitoring point among the $J_1/2$ third monitoring points, $$k_{P_{i-1,Q}}^{C_i}$$

is a third object space resolution corresponding to the Qth third monitoring point, $$d_{P_{i-1,Q}}^{C_i}$$

is the third distance corresponding to the Qth third monitoring point, $\Delta x_{P_{i-1,Q}}$ is a horizontal displacement corresponding to the Qth third monitoring point, $\theta_B$ is a first angle, and $\Delta x_{C_i}$, $\beta_{C_i}$, and $\gamma_{C_i}$ are three-degree-of-freedom movements.

B2, for each of the $J_2/2$ fifth monitoring points, a second equation corresponding to a fifth monitoring point is obtained according to a fourth horizontal variation, a fourth object space resolution, a fourth distance, a second angle, and three-degree-of-freedom movements corresponding to the fifth monitoring point.

In implementations of the present disclosure, if the fifth monitoring point is the Tth fifth monitoring point among the $J_2/2$ fifth monitoring points, the second equation can be obtained according to formula (9):

$$v_{P_{i,T}}^{C_i} = \tag{9}$$

$$k_{P_{i,T}}^{C_i} * \left[ \Delta x_{P_{i,T}} - \Delta x_{C_i} + d_{P_{i,T}}^{C_i} * \cos\theta_F * \sin\beta_{C_i} - d_{P_{i,T}}^{C_i} * \sin\theta_F * \tan\gamma_{C_i} \right]$$

where T is an integer greater than or equal to 1 and less than or equal to $J_2/2$, $$v_{P_{i,T}}^{C_i}$$

is a fourth horizontal variation corresponding to the Tth fifth monitoring point among the $J_2/2$ fifth monitoring points, $$k_{P_{i,T}}^{C_i}$$

is a fourth object space resolution corresponding to the Tth fifth monitoring point, $$d_{P_{i,T}}^{C_i}$$

is a fourth distance corresponding to the Tth fifth monitoring point, $\Delta x_{P_{i,T}}$ is a horizontal displacement amount of the Tth fifth monitoring point, $\theta_F$ is a second angle, and $\Delta x_{C_i}$, $\beta_{C_i}$, and $\gamma_{C_i}$ are three-degree-of-freedom movements.

B3, a third target equation set is obtained according to $J_1/2$ first equations corresponding to the $J_1/2$ third monitoring points and $J_2/2$ second equations corresponding to the $J_2/2$ fifth monitoring points.

In implementations of the present disclosure, the third target equation set is obtained by combining each of the $J_1/2$ first equations with each of the $J_2/2$ second equations. For example, the third target equation set is obtained by combining the Qth first equation $$v_{P_{i-1,Q}}^{C_i} = k_{P_{i-1,Q}}^{C_i} * \left[ -\Delta x_{P_{i-1,Q}} + \Delta x_{C_i} + d_{P_{i-1,Q}}^{C_i} * \cos\theta_B * \sin\beta_{C_i} - d_{P_{i-1,Q}}^{C_i} * \sin\theta_B \cdot \tan\gamma_{C_i} \right]$$

with the Tth second equation $$v_{P_{i,T}}^{C_i} = k_{P_{i,T}}^{C_i} * \left[ \Delta x_{P_{i,T}} - \Delta x_{C_i} + d_{P_{i,T}}^{C_i} * \cos\theta_F * \sin\beta_{C_i} - d_{P_{i,T}}^{C_i} * \sin\theta_F * \tan\gamma_{C_i} \right].$$

Exemplarily, the third target equation set can be obtained according to formula (10):

$$\begin{cases} v_{P_{i-1,1}}^{C_i} = k_{P_{i-1,1}}^{C_i} * \begin{bmatrix} -\Delta x_{P_{i-1,1}} + \Delta x_{C_i} + d_{P_{i-1,1}}^{C_i} * \cos\theta_B * \\ \sin\beta_{C_i} - d_{P_{i-1,1}}^{C_i} * \sin\theta_B * \tan\gamma_{C_i} \end{bmatrix} \\[2ex] v_{P_{i-1,2}}^{C_i} = k_{P_{i-1,2}}^{C_i} * \begin{bmatrix} -\Delta x_{P_{i-1,2}} + \Delta x_{C_i} + d_{P_{i-1,2}}^{C_i} * \cos\theta_B * \\ \sin\beta_{C_i} - d_{P_{i-1,2}}^{C_i} * \sin\theta_B * \tan\gamma_{C_i} \end{bmatrix} \\[2ex] \vdots \\[1ex] v_{P_{i-1,J_1/2}}^{C_i} = k_{P_{i-1,J_1/2}}^{C_i} * \begin{bmatrix} -\Delta x_{P_{i-1,J_1/2}} + \Delta x_{C_i} + d_{P_{i-1,J_1/2}}^{C_i} * \cos\theta_B * \\ \sin\beta_{C_i} - d_{P_{i-1,J_1/2}}^{C_i} * \sin\theta_B * \tan\gamma_{C_i} \end{bmatrix} \\[2ex] v_{P_{i,1}}^{C_i} = k_{P_{i,1}}^{C_i} * \begin{bmatrix} \Delta x_{P_{i,1}} - \Delta x_{C_i} + d_{P_{i,1}}^{C_i} * \cos\theta_F * \\ \sin\beta_{C_i} - d_{P_{i,1}}^{C_i} * \sin\theta_F * \tan\gamma_{C_i} \end{bmatrix} \\[2ex] v_{P_{i,2}}^{C_i} = k_{P_{i,2}}^{C_i} * \begin{bmatrix} \Delta x_{P_{i,2}} - \Delta x_{C_i} + d_{P_{i,2}}^{C_i} * \cos\theta_F * \\ \sin\beta_{C_i} - d_{P_{i,2}}^{C_i} * \sin\theta_F * \tan\gamma_{C_i} \end{bmatrix} \\[2ex] \vdots \\[1ex] v_{P_{i-1,J_2/2}}^{C_i} = k_{P_{i-1,J_2/2}}^{C_i} * \begin{bmatrix} \Delta x_{P_{i-1,J_2/2}} - \Delta x_{C_i} + d_{P_{i-1,J_2/2}}^{C_i} * \cos\theta_F * \\ \sin\beta_{C_i} - d_{P_{i-1,J_2/2}}^{C_i} * \sin\theta_F * \tan\gamma_{C_i} \end{bmatrix} \end{cases} \quad (10)$$

B4, the horizontal displacement amount of each of the $J_1/2$ third monitoring points and the horizontal displacement amount of each of the $J_2/2$ fifth monitoring points are obtained according to the third target equation set.

In implementations of the present disclosure, in order to obtain the horizontal displacement amount of each of the $J_1/2$ third monitoring points and the horizontal displacement amount of each of the $J_2/2$ fifth monitoring points according to the third target equation set, the third target equation set needs to have a solution.

It can be noted that when the first camera photographs the $J_1/2$ third monitoring points and the second camera photographs the $J_2/2$ fifth monitoring points, both the obtained first equation and the obtained second equation need to satisfy the two basic constraints and the one optimization constraint. It can be noted that the fixation constraint herein refers that all cameras in the camera array on the apparatus 10 for deformation measurement have the same three-degree-of-freedom movements at the same monitoring position, and other constrains except for the fixation constraint are not repeated herein.

Further, according to the third target equation set, one separate equation can be obtained when each of the $J_1$ first monitoring points or each of the $J_2$ second monitoring points is photographed and imaged each time. In implementations of the present disclosure, one of the monitoring positions, i.e., the first monitoring position, in a tour is taken as an example, and the $J_1/2$ third monitoring points are disposed on the left of the first monitoring position and the $J_2/2$ fifth monitoring points are disposed on the right of the first monitoring position.

Next, in the present disclosure, multiple first monitoring positions are taken as examples to illustrate whether multiple third target equation sets corresponding to the multiple first monitoring positions each have a solution. Assuming that the number of first monitoring positions is $a_1$, the total number of markers is $E_1$, i.e., the total number of monitoring points is $E_1$, the total numbers of markers photographed at $a_1$ first monitoring positions are $G_{11}$, $G_{21}$, $G_{31}$ ... $G_{a1}$, respectively, and the number of markers (denoted as "homonymous markers") photographed by more than one camera is $L_1=G_{11}+G_{21}+G_{31}+ \ldots G_{a1}-E_1$, then the number of separate equations is $(G_{11}+G_{21}+G_{31}+ \ldots G_{a1})$, and the number of unknown parameters in the equation sets is $E_1+3*a_1$, i.e., including horizontal displacement amounts of $E_1$ markers and $3a_1$ three-degree-of-freedom movements of the apparatus for deformation measurement. Therefore, in order to ensure that the equation sets each have a solution, "the number of separate equations≥the number of unknown parameters" needs to be satisfied, i.e., $(G_{11}+G_{21}+G_{31}+ \ldots G_{a1})\geq(E_1+3*a_1)$ needs to be satisfied, that is, $L_1\geq3a_1$. In other words, when $L_1\geq3a_1$ is satisfied, the horizontal displacement amounts of the $E_1$ monitoring points and the three-degree-of-freedom movements of the apparatus for deformation measurement can be obtained.

It can be noted that the unknown parameters solved are relative variations. If absolute horizontal displacement amounts of all monitoring points or horizontal displacement amounts of all monitoring points relative to reference points need to be obtained, any three reference points or three monitoring points with known horizontal displacement amounts need to be set on a whole monitoring route from the start to the end. In this case, when any camera in the camera array photographs any reference point or any monitoring point with the known horizontal displacement amount, one separate equation can be obtained.

Whether the multiple third target equation sets corresponding to the multiple first monitoring positions each have a solution is illustrated under a premise that the five-degree-of-freedom movements are all unknown parameters. However, in implementations of the present disclosure, in conjunction with an actual engineering environment, any one or more of the five-degree-of-freedom movements can be used as known parameters but not unknown parameters, so that the number of unknown parameters in the third target equation sets is reduced. For a manner for changing corresponding degree-of-freedom movements in the five-degree-of-freedom movements change from unknown parameters to known parameters, reference can be made to the manner for changing the corresponding degree-of-freedom movements in the six-degree-of-freedom movements change from unknown parameters to known parameter, which is not repeated herein.

Based on this, a principle of illustrating whether the multiple third target equation sets corresponding to the multiple first monitoring points each have a solution when one or more of the five-degree-of-freedom movements change from unknown parameters to known parameters, reference can be made to the principle of illustrating whether the multiple first target equation sets and the multiple second target equation sets corresponding to the multiple first monitoring points each have a solution when all the six-degree-of-freedom movements are unknown parameters, which is not repeated herein.

S504, a vertical subsidence amount of each of the $J_1/2$ fourth monitoring points and a vertical subsidence amount of each of the $J_2/2$ sixth monitoring points are obtained according to the first image, the second image, the third image, and the fourth image.

In implementations of the present disclosure, the operations at S504 include, but are not limited to, operations at C1 to C4.

C1, $J_1/2$ ninth pixel coordinates corresponding to the $J_1/2$ fourth monitoring points in the first image and $J_1/2$ tenth pixel coordinates corresponding to the $J_1/2$ fourth monitoring points in the third image are obtained.

The $J_1/2$ ninth pixel coordinates are in one-to-one correspondence with the $J_1/2$ fourth monitoring points, and the $J_1/2$ tenth pixel coordinates are in one-to-one correspondence with the $J_1/2$ fourth monitoring points.

C2, $J_2/2$ eleventh pixel coordinates corresponding to the $J_2/2$ sixth monitoring points in the second image and $J_2/2$ twelfth pixel coordinates corresponding to the $J_2/2$ sixth monitoring points in the fourth image are obtained.

The $J_2/2$ eleventh pixel coordinates are in one-to-one correspondence with the $J_2/2$ sixth monitoring point, and the $J_2/2$ twelfth pixel coordinates are in one-to-one correspondence with the $J_2/2$ sixth monitoring point.

C3, for each of the $J_1/2$ fourth monitoring points, a third vertical variation corresponding to a fourth monitoring point is obtained according to a ninth pixel coordinate and a tenth pixel coordinate corresponding to the fourth monitoring point; and for each of the $J_2/2$ sixth monitoring points, a fourth vertical variation corresponding to a sixth monitoring point is obtained according to an eleventh pixel coordinate and a twelfth pixel coordinate corresponding to the sixth monitoring point.

The third vertical variation is a vertical variation corresponding to the fourth monitoring point in the images, i.e., a vertical variation between the fourth monitoring point in the first image and the fourth monitoring point in the third image. The fourth vertical variation is a vertical variation corresponding to the sixth monitoring point in the images, i.e., a vertical variation between the sixth monitoring point in the second image and the sixth monitoring point in the fourth image. For a method for obtaining the vertical variation corresponding to the fourth monitoring point and the vertical variation corresponding to the sixth monitoring point, reference can be made to the method for obtaining the vertical variation corresponding to the first monitoring point, which is not repeated herein.

C4, the vertical subsidence amount of each of the $J_1/2$ fourth monitoring points and the vertical subsidence amount of each of the $J_2/2$ sixth monitoring points are determined according to $J_1/2$ third vertical variations corresponding to the $J_1/2$ fourth monitoring points, $J_2/2$ fourth vertical variations corresponding to the $J_2/2$ sixth monitoring points, the first angle and the second angle of the camera array, $J_1/2$ fifth object space resolution corresponding to the $J_1/2$ fourth monitoring points, $J_2/2$ sixth object space resolution corresponding to the $J_2/2$ sixth monitoring points, $J_1/2$ fifth distances, $J_2/2$ sixth distances, and five-degree-of-freedom movements of the apparatus for deformation measurement.

The $J_1/2$ fifth distances are distances between the first camera and each of the $J_1/2$ fourth monitoring points respectively, and the $J_2/2$ sixth distances are distances between the second camera and each of the $J_2/2$ sixth monitoring points respectively. It can be noted that both $J_1/2$ fifth distances and $J_2/2$ sixth distances are obtained by pre-calibration.

In addition, the $J_1/2$ fifth object space resolution is a magnification of the $J_1/2$ fourth monitoring points in the third image, and the $J_2/2$ sixth object space resolution is a magnification of the $J_2/2$ sixth monitoring points in the fourth image.

Optionally, in actual applications, a value of the object space resolution can be based on a calibration obtained in the first tour, i.e., an initial tour, can be based on a calibration obtained in any tour, or can be based on the average of values of the object space resolution calibrated in different tours, which is not repeated herein.

In implementations of the present disclosure, the operations at C4 include, but are not limited to, operations at D1 to D4.

D1, for each of the $J_1/2$ fourth monitoring points, a third equation corresponding to a fourth monitoring point is obtained according to a third vertical variation, a fifth object space resolution, a fifth distance, a first angle, and five-degree-of-freedom movements corresponding to the fourth monitoring point.

In implementations of the present disclosure, if the fourth monitoring point is the Uth fourth monitoring point among the $J_1/2$ fourth monitoring points, the third equation can be obtained according to formula (11):

$$h^{C_i}_{M_{i-1},U} =$$

$$k^{C_i}_{M_{i-1},U} \begin{bmatrix} \Delta y_{M_{i-1},U} - \Delta y_{C_i} + d^{C_i}_{M_{i-1},U} \cdot \sin\alpha_{C_i} / \cos(\theta_B + \alpha_{C_i}) - \\ \Delta z_{C_i} \cdot \tan\theta_B + d^{C_i}_{M_{i-1},U} \cdot \sin\theta_B(1 - \cos\beta_{C_i}) - d^{C_i}_{M_{i-1},U} \cdot \\ \sin\theta_B \cdot (1 - \cos\gamma_{C_i}) / \cos\gamma_{C_i} \end{bmatrix}$$ (11)

where U is an integer greater than or equal to 1 and less than or equal to $J_1/2$, $$h^{C_i}_{M_{i-1},U}$$

is a third vertical variation corresponding to the Uth fourth monitoring point among the $J_1/2$ fourth monitoring points, $$k^{C_i}_{M_{i-1},U}$$

is a fifth object space resolution corresponding to the Uth fourth monitoring point, $$d^{C_i}_{M_{i-1},U}$$

is a fifth distance corresponding to the Uth fourth monitoring point, $\Delta y_{M_{i-1},U}$ is a vertical subsidence corresponding to the Uth fourth monitoring point, $\theta_B$ is a first angle, and $\Delta y_{C_i}$, $\gamma_{C_i}$, $\Delta z_{C_i}$, $\alpha_{C_i}$, and $\beta_{C_i}$ are five-degree-of-freedom movements.

D2, for each of the $J_2/2$ sixth monitoring points, a fourth equation corresponding to a sixth monitoring point is obtained according to a fourth vertical variation, a sixth object space resolution, a sixth distance, a second angle, and five-degree-of-freedom movements corresponding to the sixth monitoring point.

In implementations of the present disclosure, if the sixth monitoring point is the Wth sixth monitoring point among the $J_2/2$ sixth monitoring points, the fourth equation can be obtained according to formula (12):

$$h^{C_i}_{M_i,W} = k^{C_i}_{M_i,W} \begin{bmatrix} \Delta y_{M_i,W} - \Delta y_{C_i} + d^{C_i}_{M_i,W} \cdot \sin\alpha_{C_i} / \cos(\theta_F + \alpha_{C_i}) + \\ \Delta z_{C_i} \cdot \tan\theta_F + d^{C_i}_{M_i,W} \cdot \sin\theta_F(1 - \cos\beta_{C_i}) - d^{C_i}_{M_i,W} \cdot \\ \sin\theta_F \cdot (1 - \cos\gamma_{C_i}) / \cos\gamma_{C_i} \end{bmatrix}$$ (12)

where W is an integer greater than or equal to 1 and less than or equal to $J_2/2$, $$h^{C_i}_{M_i,W}$$

is a fourth vertical variation corresponding to the Wth sixth monitoring point among the $J_2/2$ sixth monitoring points, $$k^{C_i}_{M_{i,W}}$$

is a sixth object space resolution corresponding to the Wth sixth monitoring point, $$d^{C_i}_{M_{i,W}}$$

is a sixth distance corresponding to the Wth sixth monitoring point, $\Delta y_{M_{i,W}}$ is a vertical subsidence corresponding to the Wth sixth monitoring point, $\theta_F$ is the second angle, and $\Delta y_{C_i}$, $\gamma_{C_i}$, $\Delta z_{C_i}$, $\alpha_{C_i}$, and $\beta_{C_i}$ are five-degree-of-freedom movements.

D3, a fourth target equation set is obtained according to $J_1/2$ third equations corresponding to the $J_1/2$ fourth monitoring points and $J_2/2$ fourth equations corresponding to the $J_2/2$ sixth monitoring points.

In implementations of the present disclosure, the fourth target equation set is obtained by combining each of the $J_1/2$ third equations with each of the $J_2/2$ fourth equations. For example, the fourth target equation set is obtained by combining the Uth third equation $$h^{C_i}_{M_{i-1,U}} = k^{C_i}_{M_{i-1,U}} \begin{bmatrix} \Delta y_{M_{i-1,U}} - \Delta y_{C_i} - d^{C_i}_{M_{i-1,U}} \cdot \sin \alpha_{C_i} / \cos(\theta_B + \alpha_{C_i}) - \\ \Delta z_{C_i} \cdot \tan \theta_B + d^{C_i}_{M_{i-1,U}} \cdot \sin \theta_B (1 - \cos \beta_{C_i}) - d^{C_i}_{M_{i-1,U}} \cdot \\ \sin \theta_B \cdot (1 - \cos \gamma_{C_i}) / \cos \gamma_{C_i} \end{bmatrix}$$

with the Wth fourth equation $$h^{C_i}_{M_{i,W}} = k^{C_i}_{M_{i,W}} \begin{bmatrix} \Delta y_{M_{i,W}} - \Delta y_{C_i} + d^{C_i}_{M_{i,W}} \cdot \sin \alpha_{C_i} / \cos(\theta_F + \alpha_{C_i}) + \\ \Delta z_{C_i} \cdot \tan \theta_F + d^{C_i}_{M_{i,W}} \cdot \sin \theta_F (1 - \cos \beta_{C_i}) - d^{C_i}_{M_{i,W}} \cdot \\ \sin \theta_F \cdot (1 - \cos \gamma_{C_i}) / \cos \gamma_{C_i} \end{bmatrix}.$$

Exemplarily, the fourth target equation set can be obtained according to formula (13):

$$\begin{cases} h^{C_i}_{M_{i-1,1}} = k^{C_i}_{M_{i-1,1}} \begin{bmatrix} \Delta y_{M_{i-1,1}} - \Delta y_{C_i} - d^{C_i}_{M_{i-1,1}} \cdot \sin \alpha_{C_i} / \cos(\theta_B + \alpha_{C_i}) - \Delta z_{C_i} \cdot \tan \theta_B + \\ d^{C_i}_{M_{i-1,1}} \cdot \sin \theta_B (1 - \cos \beta_{C_i}) - d^{C_i}_{M_{i-1,1}} \cdot \sin \theta_B \cdot (1 - \cos \gamma_{C_i}) / \cos \gamma_{C_i} \end{bmatrix} \\ h^{C_i}_{M_{i-1,2}} = k^{C_i}_{M_{i-1,2}} \begin{bmatrix} \Delta y_{M_{i-1,2}} - \Delta y_{C_i} - d^{C_i}_{M_{i-1,2}} \cdot \sin \alpha_{C_i} / \cos(\theta_B + \alpha_{C_i}) - \Delta z_{C_i} \cdot \tan \theta_B + \\ d^{C_i}_{M_{i-1,2}} \cdot \sin \theta_B (1 - \cos \beta_{C_i}) - d^{C_i}_{M_{i-1,2}} \cdot \sin \theta_B \cdot (1 - \cos \gamma_{C_i}) / \cos \gamma_{C_i} \end{bmatrix} \\ \vdots \\ h^{C_i}_{M_{i-1,J_1/2}} = k^{C_i}_{M_{i-1,J_1/2}} \begin{bmatrix} \Delta y_{M_{i-1,J_1/2}} - \Delta y_{C_i} - d^{C_i}_{M_{i-1,J_1/2}} \cdot \sin \alpha_{C_i} / \cos(\theta_B + \alpha_{C_i}) - \Delta z_{C_i} \cdot \tan \theta_B + \\ d^{C_i}_{M_{i-1,J_1/2}} \cdot \sin \theta_B (1 - \cos \beta_{C_i}) - d^{C_i}_{M_{i-1,J_1/2}} \cdot \sin \theta_B \cdot (1 - \cos \gamma_{C_i}) / \cos \gamma_{C_i} \end{bmatrix} \\ h^{C_i}_{M_{i,1}} = k^{C_i}_{M_{i,1}} \begin{bmatrix} \Delta y_{M_{i,1}} - \Delta y_{C_i} + d^{C_i}_{M_{i,1}} \cdot \sin \alpha_{C_i} / \cos(\theta_F + \alpha_{C_i}) + \Delta z_{C_i} \cdot \tan \theta_F + \\ d^{C_i}_{M_{i,1}} \cdot \sin \theta_F (1 - \cos \beta_{C_i}) - d^{C_i}_{M_{i,1}} \cdot \sin \theta_F \cdot (1 - \cos \gamma_{C_i}) / \cos \gamma_{C_i} \end{bmatrix} \\ h^{C_i}_{M_{i,2}} = k^{C_i}_{M_{i,2}} \begin{bmatrix} \Delta y_{M_{i,2}} - \Delta y_{C_i} + d^{C_i}_{M_{i,2}} \cdot \sin \alpha_{C_i} / \cos(\theta_F + \alpha_{C_i}) + \Delta z_{C_i} \cdot \tan \theta_F + \\ d^{C_i}_{M_{i,2}} \cdot \sin \theta_F (1 - \cos \beta_{C_i}) - d^{C_i}_{M_{i,2}} \cdot \sin \theta_F \cdot (1 - \cos \gamma_{C_i}) / \cos \gamma_{C_i} \end{bmatrix} \\ \vdots \\ h^{C_i}_{M_{i,J_2/2}} = k^{C_i}_{M_{i,J_2/2}} \begin{bmatrix} \Delta y_{M_{i,J_2/2}} - \Delta y_{C_i} + d^{C_i}_{M_{i,J_2/2}} \cdot \sin \alpha_{C_i} / \cos(\theta_F + \alpha_{C_i}) + \Delta z_{C_i} \cdot \tan \theta_F + \\ d^{C_i}_{M_{i,J_2/2}} \cdot \sin \theta_F (1 - \cos \beta_{C_i}) - d^{C_i}_{M_{i,J_2/2}} \cdot \sin \theta_F \cdot (1 - \cos \gamma_{C_i}) / \cos \gamma_{C_i} \end{bmatrix} \end{cases}$$

D4, the vertical subsidence amount of each of the $J_1/2$ fourth monitoring points and the vertical subsidence amount of each of the $J_2/2$ sixth monitoring points are obtained according to the fourth target equation set.

In implementations of the present disclosure, in order to obtain the vertical displacement amount of each of the $J_1/2$ fourth monitoring points and the vertical displacement amount of each of the $J_2/2$ sixth monitoring points according to the fourth target equation set, the fourth target equation set needs to have a solution.

It can be noted that when the first camera photographs the $J_1/2$ fourth monitoring points and the second camera photographs the $J_2/2$ sixth monitoring points, both the obtained third equation and the obtained fourth equation need to satisfy the two basic constraints and the one optimization constraint. It can be noted that the fixation constraint herein refers that all cameras in the camera array on the apparatus 10 for deformation measurement have the same five-degree-of-freedom movements at the same monitoring position, and other constraints except for the fixation constraint are not repeated herein.

Further, according to the fourth target equation set, one separate equation can be obtained when each of the $J_1/2$ fourth monitoring points or each of the $J_2/2$ sixth monitoring points is photographed and imaged each time. In implementations of the present disclosure, one of the monitoring positions, i.e., the first monitoring position, in a tour is taken as an example, and the $J_1/2$ fourth monitoring points are disposed on the left of the first monitoring position and the $J_2/2$ sixth monitoring points are disposed on the right of the first monitoring position.

Next, in the present disclosure, multiple first monitoring positions are taken as examples to illustrate whether multiple fourth target equation sets corresponding to the multiple first monitoring positions each have a solution. Assuming that the number of first monitoring positions is $a_2$, the total number of markers is $E_2$, i.e., the total number of monitoring points is $E_2$, the total numbers of markers photographed at $a_2$ first monitoring positions are $G_{12}$, $G_{22}$, $G_{32}$ ... $G_{a2}$, respectively, and the number of markers (denoted as "homonymous markers") photographed by more than one camera is $L_2 = G_{12} + G_{22} + G_{32} + \ldots G_{a2} - E_2$, then the (13)

number of separate equations is $(G_{12}+G_{22}+G_{32}+ \ldots G_{a2})$, and the number of unknown parameters in the equation sets is $E_2+5^*a_2$, i.e., including horizontal displacement amounts of $E_2$ markers and $3a_2$ five-degree-of-freedom movements of the apparatus for deformation measurement. Therefore, in order to ensure that the equation sets each have a solution, "the number of separate equations≥the number of unknown parameters" needs to be satisfied, i.e., $(G_{12}+G_{22}+G_{32}+ \ldots G_{a2})\geq(E_2+5^*a_2)$ needs to be satisfied, that is, $L_2\geq5a_2$. In other words, when $L_2\geq5a_2$ is satisfied, the horizontal displacement amounts of the $E_2$ monitoring points and the five-degree-of-freedom movements of the apparatus for deformation measurement can be obtained.

It can be noted that the unknown parameters solved are relative variations. If absolute vertical displacement amounts of all monitoring points or vertical displacement amounts of all monitoring points relative to reference points need to be obtained, any five reference points or five monitoring points with known vertical displacement amounts need to be set on a whole monitoring route from the start to the end. In this case, when any camera in the camera array photographs any reference point or any monitoring point with the known vertical displacement amount, one separate equation can be obtained.

Whether the multiple fourth target equation sets corresponding to the multiple first monitoring positions each have a solution is illustrated under a premise that the three-degree-of-freedom movements are all unknown parameters. However, in implementations of the present disclosure, in conjunction with an actual engineering environment, any one or more of the three-degree-of-freedom movements can be used as known parameters but not unknown parameters, so that the number of unknown parameters in the fourth target equation sets is reduced. For a manner for changing corresponding degree-of-freedom movements in the three-degree-of-freedom movements change from unknown parameters to known parameters, reference can be made to the manner for changing the corresponding degree-of-freedom movements in the six-degree-of-freedom movements change from unknown parameters to known parameters, which is not repeated herein.

Based on this, a principle of illustrating whether the multiple fourth target equation sets corresponding to the multiple first monitoring points each have a solution when one or more of the three-degree-of-freedom movements change from unknown parameters to known parameters, reference can be made to the principle of illustrating whether the multiple first target equation sets and the multiple second target equation sets corresponding to the multiple first monitoring points each have a solution when all the six-degree-of-freedom movements are unknown parameters, which is not repeated herein.

Figure 6:
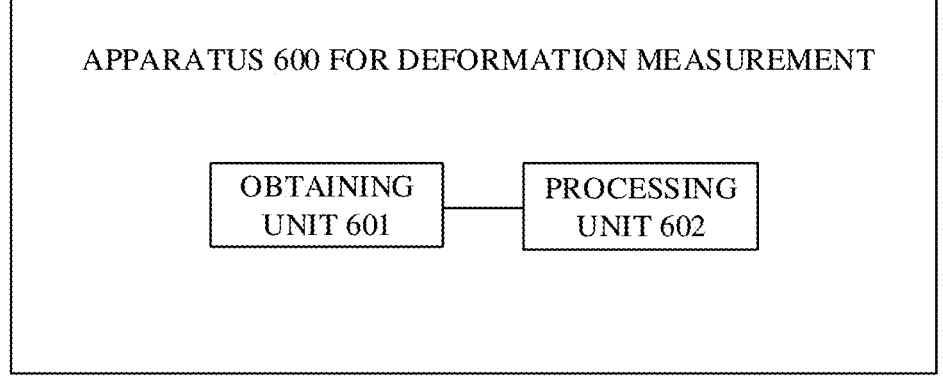
FIG. 6 is a block diagram of functional units of an apparatus for deformation measurement provided in implementations of the present disclosure.

Reference can be made to FIG. 6, which is a block diagram of functional units of an apparatus for deformation measurement provided in implementations of the present disclosure. An apparatus 600 for deformation measurement includes an obtaining unit 601 and a processing unit 602. The obtaining unit 601 is configured to operate as follows. The obtaining unit 601 is configured to, in response to the mobile platform moving to a first monitoring position in an area to-be-measured, obtain a first image by photographing, by a first camera in the camera array, monitoring points in a first area to-be-measured in the area to-be-measured, and obtain a second image by photographing, by a second camera in the camera array, monitoring points in a second area to-be-measured in the area to-be-measured; where the monitoring points in the first area to-be-measured are disposed on one side of the first monitoring position, the monitoring points in the second area to-be-measured are disposed on the other side of the first monitoring position, and the first camera has an opposite photographing direction with the second camera. The obtaining unit 601 is configured to, in response to the mobile platform moving to a second monitoring position in the area to-be-measured, obtain a third image by photographing, by the first camera, the monitoring points in the first area to-be-measured, and obtain a fourth image by photographing, by the second camera, the monitoring points in the second area to-be-measured. The processing unit 602 is configured to determine $J_1$ first monitoring points according to the first image and the third image, and is configured to determine $J_2$ second monitoring points according to the second image and the fourth image; where the $J_1$ first monitoring points are monitoring points included in both the first image and the third image, and the $J_2$ second monitoring points are monitoring points included in both the second image and the fourth image. The processing unit 602 is configured to obtain a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image.

In an implementation of the present disclosure, in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the processing unit 602 is specifically configured to operate as follows. The processing unit 602 is specifically configured to obtain $J_1$ first pixel coordinates corresponding to the $J_1$ first monitoring points in the first image. The processing unit 602 is specifically configured to obtain $J_1$ second pixel coordinates corresponding to the $J_1$ first monitoring points in the third image. For each of the $J_1$ first monitoring points, the processing unit 602 is specifically configured to obtain a first vertical variation and a first horizontal variation corresponding to a first monitoring point according to a first pixel coordinate and a second pixel coordinate corresponding to the first monitoring point. The processing unit 602 is specifically configured to obtain $J_2$ third pixel coordinates corresponding to the $J_2$ second monitoring points in the second image. The processing unit 602 is specifically configured to obtain $J_2$ fourth pixel coordinates corresponding to the $J_2$ second monitoring points in the fourth image. For each of the $J_2$ second monitoring points, the processing unit 602 is specifically configured to obtain a second vertical variation and a second horizontal variation corresponding to a second monitoring point according to a third pixel coordinate and a fourth pixel coordinate corresponding to the second monitoring point. The processing unit 602 is specifically configured to determine the horizontal displacement amount and the vertical subsidence amount of each of the $J_1$ first monitoring points and the horizontal displacement amount and the vertical subsidence amount of each of the $J_2$ second monitoring points according to $J_1$ first vertical variations and $J_1$ first horizontal variations corresponding to the $J_1$ first monitoring points, $J_2$ second vertical variations and $J_2$ second horizontal variations corresponding to the $J_2$ second monitoring points, a first angle and a second angle of the camera array, $J_1$ first object space resolution corresponding to the $J_1$ first monitoring points, $J_2$ second object space resolution corresponding to the $J_2$ second monitoring points, $J_1$ first distances, $J_2$ second distances, and six-degree-of-freedom movements of the apparatus for deformation measurement, where the first angle is an angle between an optical axis of the first camera and a horizontal plane, the second angle is an angle between an optical axis of the second camera and the horizontal plane, the $J_1$ first distances are distances between the first camera and each of the $J_1$ first monitoring points respectively, and the $J_2$ second distances are distances between the second camera and each of the $J_2$ second monitoring points respectively.

In an implementation of the present disclosure, in terms of determining the horizontal displacement amount and the vertical subsidence amount of each of the $J_1$ first monitoring points and the horizontal displacement amount and the vertical subsidence amount of each of the $J_2$ second monitoring points according to the $J_1$ first vertical variations and the $J_1$ first horizontal variations corresponding to the $J_1$ first monitoring points, the $J_2$ second vertical variations and the $J_2$ second horizontal variations corresponding to the $J_2$ second monitoring points, the first angle and the second angle of the camera array, the $J_1$ first object space resolution corresponding to the $J_1$ first monitoring points, the $J_2$ second object space resolution corresponding to the $J_2$ second monitoring points, the $J_1$ first distances, the $J_2$ second distances, and the six-degree-of-freedom movements of the apparatus for deformation measurement, the processing unit 602 is specifically configured to operate as follows. For each of the $J_1$ first monitoring points, the processing unit 602 is specifically configured to obtain a first equation set corresponding to a first monitoring point according to a first vertical variation, a first horizontal variation, a first angle, a first object space resolution, a first distance, and six-degree-of-freedom movements corresponding to the first monitoring point. For each of $J_2$ second monitoring points, the processing unit 602 is specifically configured to obtain a second equation set corresponding to a second monitoring point according to a second vertical variation, a second horizontal variation, a second angle, a second object space resolution, a second distance, and six-degree-of-freedom movements corresponding to the second monitoring point. The processing unit 602 is specifically configured to obtain a first target equation set and a second target equation set according to $J_1$ first equation sets corresponding to the $J_1$ first monitoring points and $J_2$ second equation sets corresponding to the $J_2$ second monitoring points. The processing unit 602 is specifically configured to obtain the vertical subsidence amount of each of the $J_1$ first monitoring points and the vertical subsidence amount of each of the $J_2$ second monitoring points according to the first target equation set; and the processing unit 602 is specifically configured to obtain the horizontal displacement amount of each of the $J_1$ first monitoring points and the horizontal displacement amount of each of the $J_2$ second monitoring points according to the second target equation set.

In an implementation of the present disclosure, in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the processing unit 602 is specifically configured to operate as follows. The number of $J_1$ first monitoring points is even, and the $J_1$ first monitoring points include $J_1/2$ third monitoring points and $J_1/2$ fourth monitoring points. The number of $J_2$ second monitoring points is even, and the $J_2$ second monitoring points include $J_2/2$ fifth monitoring points and $J_2/2$ sixth monitoring points. The processing unit 602 is specifically configured to obtain a horizontal displacement amount of each of the $J_1/2$ third monitoring points, a horizontal displacement amount of each of the $J_2/2$ fifth monitoring points, a vertical subsidence amount of each of the $J_1/2$ fourth monitoring points, and a vertical subsidence amount of each of the $J_2/2$ sixth monitoring points according to the first image, the second image, the third image, and the fourth image.

In an implementation of the present disclosure, in terms of obtaining the horizontal displacement amount of each of the $J_1/2$ third monitoring points, the horizontal displacement amount of each of the $J_2/2$ fifth monitoring points, the vertical subsidence amount of each of the $J_1/2$ fourth monitoring points, and the vertical subsidence amount of each of the $J_2/2$ sixth monitoring points according to the first image, the second image, the third image, and the fourth image, the processing unit 602 is specifically configured to operate as follows. The processing unit 602 is specifically configured to obtain $J_1/2$ fifth pixel coordinates corresponding to the $J_1/2$ third monitoring points in the first image and $J_1/2$ sixth pixel coordinates corresponding to the $J_1/2$ third monitoring points in the third image. The processing unit 602 is specifically configured to obtain $J_2/2$ seventh pixel coordinates corresponding to the $J_2/2$ fifth monitoring points in the second image and $J_2/2$ eighth pixel coordinates corresponding to the $J_2/2$ fifth monitoring points in the fourth image. For each of the $J_1/2$ third monitoring points, the processing unit 602 is specifically configured to obtain a third horizontal variation corresponding to a third monitoring point according to a fifth pixel coordinate and a sixth pixel coordinate corresponding to the third monitoring point; and for each of the $J_2/2$ fifth monitoring points, the processing unit 602 is specifically configured to obtain a fourth horizontal variation corresponding to a fifth monitoring point according to a seventh pixel coordinate and an eighth pixel coordinate corresponding to the fifth monitoring point. The processing unit 602 is specifically configured to obtain $J_1/2$ ninth pixel coordinates corresponding to the $J_1/2$ fourth monitoring points in the first image and $J_1/2$ tenth pixel coordinates corresponding to the $J_1/2$ fourth monitoring points in the third image. The processing unit 602 is specifically configured to obtain $J_2/2$ eleventh pixel coordinates corresponding to the $J_2/2$ sixth monitoring points in the second image and $J_2/2$ twelfth pixel coordinates corresponding to the $J_2/2$ sixth monitoring points in the fourth image. For each of the $J_1/2$ fourth monitoring points, the processing unit 602 is specifically configured to obtain a third vertical variation corresponding to a fourth monitoring point according to a ninth pixel coordinate and a tenth pixel coordinate corresponding to the fourth monitoring point; and for each of the $J_2/2$ sixth monitoring points, the processing unit 602 is specifically configured to obtain a fourth vertical variation corresponding to a sixth monitoring point according to an eleventh pixel coordinate and a twelfth pixel coordinate corresponding to the sixth monitoring point. The processing unit 602 is specifically configured to determine the horizontal displacement amount of each of the $J_1/2$ third monitoring points and the horizontal displacement amount of each of the $J_2/2$ fifth monitoring points according to $J_1/2$ third horizontal variations corresponding to the $J_1/2$ third monitoring points, $J_2/2$ fourth horizontal variations corresponding to the $J_2/2$ fifth monitoring points, a first angle and a second angle of the camera array, $J_1/2$ third object space resolution corresponding to the $J_1/2$ third monitoring points, $J_2/2$ fourth object space resolution corresponding to the $J_2/2$ fifth monitoring points, $J_1/2$ third distances, $J_2/2$ fourth distances, and three-degree-of-freedom movements of the apparatus for deformation measurement, where the first angle is an angle between an optical axis of the first camera and a horizontal plane, the second angle is an angle between an optical axis of the second camera and the horizontal plane, the $J_1/2$ third distances are distances between the first camera and each of the $J_1/2$ third monitoring points respectively, and the $J_2/2$ fourth distances are distances between the second camera and each of the $J_2/2$ fifth monitoring points respectively. The processing unit 602 is specifically configured to determine the vertical subsidence amount of each of the $J_1/2$ fourth monitoring points and the vertical subsidence amount of each of the $J_2/2$ sixth monitoring points according to $J_1/2$ third vertical variations corresponding to the $J_1/2$ fourth monitoring points, $J_2/2$ fourth vertical variations corresponding to the $J_2/2$ sixth monitoring points, the first angle and the second angle of the camera array, $J_1/2$ fifth object space resolution corresponding to the $J_1/2$ fourth monitoring points, $J_2/2$ sixth object space resolution corresponding to the $J_2/2$ sixth monitoring points, $J_1/2$ fifth distances, $J_2/2$ sixth distances, and five-degree-of-freedom movements of the apparatus for deformation measurement, where the first angle is the angle between the optical axis of the first camera and the horizontal plane, the second angle is the angle between the optical axis of the second camera and the horizontal plane, the $J_1/2$ fifth distances are distances between the first camera and each of the $J_1/2$ fourth monitoring points respectively, and the $J_2/2$ sixth distances are distances between the second camera and each of the $J_2/2$ sixth monitoring points respectively.

Figure 7:
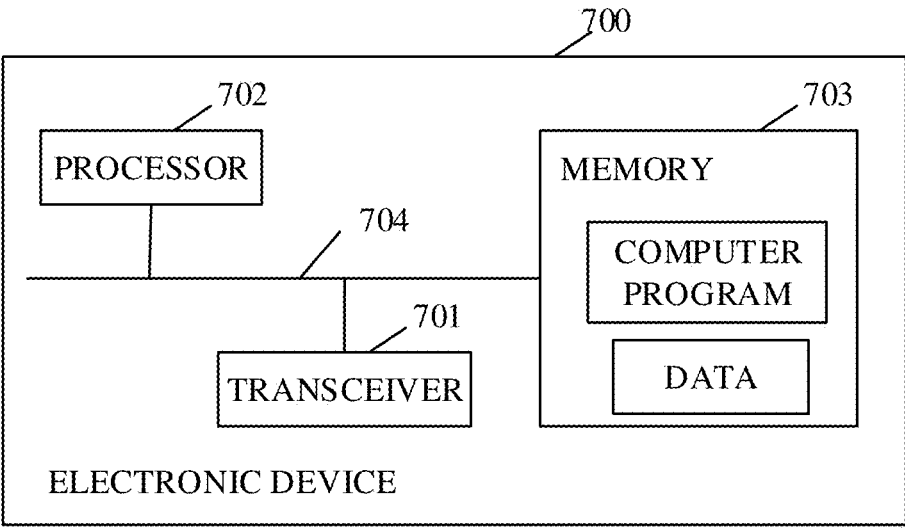
FIG. 7 is a schematic structural diagram of an electronic device provided in implementations of the present disclosure.

Reference can be made to FIG. 7, which is a schematic structural diagram of an electronic device provided in implementations of the present disclosure. As illustrated in FIG. 7, an electronic device 700 includes a transceiver 701, a processor 702, and a memory 703. The transceiver 701, the processor 702, and the memory 703 are connected to each other via a bus 704. The memory 703 is configured to store a computer program and data, and the data stored in the memory 703 can be transmitted to the processor 702.

The processor 702 is configured to read the computer program in the memory 703 to operate as follows. The processor 702 is configured to control the transceiver 701 to, in response to the mobile platform moving to a first monitoring position in an area to-be-measured, obtain a first image by photographing, by a first camera in the camera array, monitoring points in a first area to-be-measured in the area to-be-measured, and obtain a second image by photographing, by a second camera in the camera array, monitoring points in a second area to-be-measured in the area to-be-measured; where the monitoring points in the first area to-be-measured are disposed on one side of the first monitoring position, the monitoring points in the second area to-be-measured are disposed on the other side of the first monitoring position, and the first camera has an opposite photographing direction with the second camera. The processor 702 is configured to control the transceiver 701 to, in response to the mobile platform moving to a second monitoring position in the area to-be-measured, obtain a third image by photographing, by the first camera, the monitoring points in the first area to-be-measured, and obtain a fourth image by photographing, by the second camera, the monitoring points in the second area to-be-measured. The processor 702 is configured to determine $J_1$ first monitoring points according to the first image and the third image, and is configured to determine $J_2$ second monitoring points according to the second image and the fourth image; where the $J_1$ first monitoring points are monitoring points included in both the first image and the third image, and the $J_2$ second monitoring points are monitoring points included in both the second image and the fourth image. The processor 702 is configured to obtain a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image.

In an implementation of the present disclosure, in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the processor 702 is specifically configured to operate as follows. The processor 702 is specifically configured to obtain $J_1$ first pixel coordinates corresponding to the $J_1$ first monitoring points in the first image. The processor 702 is specifically configured to obtain $J_1$ second pixel coordinates corresponding to the $J_1$ first monitoring points in the third image. For each of the $J_1$ first monitoring points, the processor 702 is specifically configured to obtain a first vertical variation and a first horizontal variation corresponding to a first monitoring point according to a first pixel coordinate and a second pixel coordinate corresponding to the first monitoring point. The processor 702 is specifically configured to obtain $J_2$ third pixel coordinates corresponding to the $J_2$ second monitoring points in the second image. The processor 702 is specifically configured to obtain $J_2$ fourth pixel coordinates corresponding to the $J_2$ second monitoring points in the fourth image. For each of the $J_2$ second monitoring points, the processor 702 is specifically configured to obtain a second vertical variation and a second horizontal variation corresponding to a second monitoring point according to a third pixel coordinate and a fourth pixel coordinate corresponding to the second monitoring point. The processor 702 is specifically configured to determine the horizontal displacement amount and the vertical subsidence amount of each of the $J_1$ first monitoring points and the horizontal displacement amount and the vertical subsidence amount of each of the $J_2$ second monitoring points according to $J_1$ first vertical variations and $J_1$ first horizontal variations corresponding to the $J_1$ first monitoring points, $J_2$ second vertical variations and $J_2$ second horizontal variations corresponding to the $J_2$ second monitoring points, a first angle and a second angle of the camera array, $J_1$ first object space resolution corresponding to the $J_1$ first monitoring points, $J_2$ second object space resolution corresponding to the $J_2$ second monitoring points, $J_1$ first distances, $J_2$ second distances, and six-degree-of-freedom movements of the apparatus for deformation measurement, where the first angle is an angle between an optical axis of the first camera and a horizontal plane, the second angle is an angle between an optical axis of the second camera and the horizontal plane, the $J_1$ first distances are distances between the first camera and each of the $J_1$ first monitoring points respectively, and the $J_2$ second distances are distances between the second camera and each of the $J_2$ second monitoring points respectively.

In an implementation of the present disclosure, in terms of determining the horizontal displacement amount and the vertical subsidence amount of each of the $J_1$ first monitoring points and the horizontal displacement amount and the vertical subsidence amount of each of the $J_2$ second monitoring points according to the $J_1$ first vertical variations and the $J_1$ first horizontal variations corresponding to the $J_1$ first monitoring points, the $J_2$ second vertical variations and the $J_2$ second horizontal variations corresponding to the $J_2$ second monitoring points, the first angle and the second angle of the camera array, the $J_1$ first object space resolution corresponding to the $J_1$ first monitoring points, the $J_2$ second object space resolution corresponding to the $J_2$ second monitoring points, the $J_1$ first distances, the $J_2$ second distances, and the six-degree-of-freedom movements of the apparatus for deformation measurement, the processor 702 is specifically configured to operate as follows. For each of the $J_1$ first monitoring points, the processor 702 is specifically configured to obtain a first equation set corresponding to a first monitoring point according to a first vertical variation, a first horizontal variation, a first angle, a first object space resolution, a first distance, and six-degree-of-freedom movements corresponding to the first monitoring point. For each of $J_2$ second monitoring points, the processor 702 is specifically configured to obtain a second equation set corresponding to a second monitoring point according to a second vertical variation, a second horizontal variation, a second angle, a second object space resolution, a second distance, and six-degree-of-freedom movements corresponding to the second monitoring point. The processor 702 is specifically configured to obtain a first target equation set and a second target equation set according to $J_1$ first equation sets corresponding to the $J_1$ first monitoring points and $J_2$ second equation sets corresponding to the $J_2$ second monitoring points. The processor 702 is specifically configured to obtain the vertical subsidence amount of each of the $J_1$ first monitoring points and the vertical subsidence amount of each of the $J_2$ second monitoring points according to the first target equation set; and the processor 702 is specifically configured to obtain the horizontal displacement amount of each of the $J_1$ first monitoring points and the horizontal displacement amount of each of the $J_2$ second monitoring points according to the second target equation set.

In an implementation of the present disclosure, in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the processor 702 is specifically configured to operate as follows. The number of $J_1$ first monitoring points is even, and the $J_1$ first monitoring points include $J_1/2$ third monitoring points and $J_1/2$ fourth monitoring points. The number of $J_2$ second monitoring points is even, and the $J_2$ second monitoring points include $J_2/2$ fifth monitoring points and $J_2/2$ sixth monitoring points. The processor 702 is specifically configured to obtain a horizontal displacement amount of each of the $J_1/2$ third monitoring points, a horizontal displacement amount of each of the $J_2/2$ fifth monitoring points, a vertical subsidence amount of each of the $J_1/2$ fourth monitoring points, and a vertical subsidence amount of each of the $J_2/2$ sixth monitoring points according to the first image, the second image, the third image, and the fourth image.

In an implementation of the present disclosure, in terms of obtaining the horizontal displacement amount of each of the $J_1/2$ third monitoring points, the horizontal displacement amount of each of the $J_2/2$ fifth monitoring points, the vertical subsidence amount of each of the $J_1/2$ fourth monitoring points, and the vertical subsidence amount of each of the $J_2/2$ sixth monitoring points according to the first image, the second image, the third image, and the fourth image, the processor 702 is specifically configured to operate as follows. The processor 702 is specifically configured to obtain $J_1/2$ fifth pixel coordinates corresponding to the $J_1/2$ third monitoring points in the first image and $J_1/2$ sixth pixel coordinates corresponding to the $J_1/2$ third monitoring points in the third image. The processor 702 is specifically configured to obtain $J_2/2$ seventh pixel coordinates corresponding to the $J_2/2$ fifth monitoring points in the second image and $J_2/2$ eighth pixel coordinates corresponding to the $J_2/2$ fifth monitoring points in the fourth image. For each of the $J_1/2$ third monitoring points, the processor 702 is specifically configured to obtain a third horizontal variation corresponding to a third monitoring point according to a fifth pixel coordinate and a sixth pixel coordinate corresponding to the third monitoring point; and for each of the $J_2/2$ fifth monitoring points, the processor 702 is specifically configured to obtain a fourth horizontal variation corresponding to a fifth monitoring point according to a seventh pixel coordinate and an eighth pixel coordinate corresponding to the fifth monitoring point. The processor 702 is specifically configured to obtain $J_1/2$ ninth pixel coordinates corresponding to the $J_1/2$ fourth monitoring points in the first image and $J_1/2$ tenth pixel coordinates corresponding to the $J_1/2$ fourth monitoring points in the third image. The processor 702 is specifically configured to obtain $J_2/2$ eleventh pixel coordinates corresponding to the $J_2/2$ sixth monitoring points in the second image and $J_2/2$ twelfth pixel coordinates corresponding to the $J_2/2$ sixth monitoring points in the fourth image. For each of the $J_1/2$ fourth monitoring points, the processor 702 is specifically configured to obtain a third vertical variation corresponding to a fourth monitoring point according to a ninth pixel coordinate and a tenth pixel coordinate corresponding to the fourth monitoring point; and for each of the $J_2/2$ sixth monitoring points, the processor 702 is specifically configured to obtain a fourth vertical variation corresponding to a sixth monitoring point according to an eleventh pixel coordinate and a twelfth pixel coordinate corresponding to the sixth monitoring point. The processor 702 is specifically configured to determine the horizontal displacement amount of each of the $J_1/2$ third monitoring points and the horizontal displacement amount of each of the $J_2/2$ fifth monitoring points according to $J_1/2$ third horizontal variations corresponding to the $J_1/2$ third monitoring points, $J_2/2$ fourth horizontal variations corresponding to the $J_2/2$ fifth monitoring points, a first angle and a second angle of the camera array, $J_1/2$ third object space resolution corresponding to the $J_1/2$ third monitoring points, $J_2/2$ fourth object space resolution corresponding to the $J_2/2$ fifth monitoring points, $J_1/2$ third distances, $J_2/2$ fourth distances, and three-degree-of-freedom movements of the apparatus for deformation measurement, where the first angle is an angle between an optical axis of the first camera and a horizontal plane, the second angle is an angle between an optical axis of the second camera and the horizontal plane, the $J_1/2$ third distances are distances between the first camera and each of the $J_1/2$ third monitoring points respectively, and the $J_2/2$ fourth distances are distances between the second camera and each of the $J_2/2$ fifth monitoring points respectively. The processor 702 is specifically configured to determine the vertical subsidence amount of each of the $J_1/2$ fourth monitoring points and the vertical subsidence amount of each of the $J_2/2$ sixth monitoring points according to $J_1/2$ third vertical variations corresponding to the $J_1/2$ fourth monitoring points, $J_2/2$ fourth vertical variations corresponding to the $J_2/2$ sixth monitoring points, the first angle and the second angle of the camera array, $J_1/2$ fifth object space resolution corresponding to the $J_1/2$ fourth monitoring points, $J_2/2$ sixth object space resolution corresponding to the $J_2/2$ sixth monitoring points, $J_1/2$ fifth distances, $J_2/2$ sixth distances, and five-degree-of-freedom movements of the apparatus for deformation measurement, where the first angle is the angle between the optical axis of the first camera and the horizontal plane, the second angle is the angle between the optical axis of the second camera and the horizontal plane, the $J_1/2$ fifth distances are distances between the first camera and each of the $J_1/2$ fourth monitoring points respectively, and the $J_2/2$ sixth distances are distances between the second camera and each of the $J_2/2$ sixth monitoring points respectively.

Specifically, the transceiver 701 can be the obtaining unit 601 of the apparatus 600 for deformation measurement in the implementation of FIG. 6, and the processor 702 can be the processing unit 602 of the apparatus 600 for deformation measurement in the implementation of FIG. 6.

It can be understood that the electronic device in the present disclosure can include smartphones (e.g., Android phones, iOS phones, Windows Phone (WP) phones, etc.), tablets, personal digital assistants (PDAs), laptops, mobile internet devices (MIDs), wearable devices, etc. The electronic devices are only examples, not an exhaustive list, and include but are not limited to the electronic devices. In actual applications, the electronic device can also include intelligent vehicle terminals, computer devices, etc.

A computer-readable storage medium is provided in implementations of the present disclosure. The computer-readable storage medium is configured to store a computer program which, when executed by a processor, causes the processor to perform some or all of the steps of any method for deformation measurement in the method implementations.

A computer program product is further provided in implementations of the present disclosure. The computer program product includes a non-transitory computer-readable storage medium configured to store a computer program, and the computer program is operable to cause a computer to perform some or all of the steps of any method for deformation measurement in the method implementations.

It can be noted that, for the sake of simplicity, various method implementations above are described as a series of action combinations. However, it will be appreciated by those skilled in the art that the present disclosure is not limited by the sequence of actions described. According to the present disclosure, some steps may be performed in other orders or simultaneously. In addition, it will be appreciated by those skilled in the art that the implementations described in the specification are preferable implementations, and the actions and modules involved are not necessarily essential to the present disclosure.

In the foregoing implementations, the description of each implementation has its own emphasis. For the parts not described in detail in one implementation, reference may be made to related illustrations in other implementations.

It can be appreciated that the apparatuses disclosed in implementations of the present disclosure may also be implemented in various other manners. For example, the above apparatus implementations are merely illustrative, e.g., the division of units is only a division of logical functions, and other manners of division may also be available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired targets of the solutions of implementations.

In addition, various functional units described in various implementations of the present disclosure may be integrated into one processing unit or may be present as a number of physically separated units, and two or more units may be integrated into one. The integrated unit may take the form of hardware or a software functional module.

If the integrated units are implemented as software functional modules and sold or used as standalone products, the integrated units may be stored in a computer-readable storage medium. Based on such an understanding, the essential technical solution, a portion that contributes to the prior art, or all or part of the technical solutions of the present disclosure may be embodied as software products. The computer software product can be stored in a memory and may include multiple instructions that, when executed, can cause a computer device (e.g., a personal computer, a server, a network device, etc.,) to perform some or all operations of the methods described in various implementations of the present disclosure. The above memory may include various kinds of media that can store program codes, such as a universal serial bus (USB) flash disk, a read-only memory (ROM), a random-access memory (RAM), a mobile hard drive, a magnetic disk, an optical disk, etc.

It can be understood by those of ordinary skill in the art that, all or some of the steps in the foregoing implementations can be accomplished by means of a program to instruct associated hardware. The program can be stored in a computer-readable storage medium. The storage medium can be a flash disk, an ROM, an RAM, a magnetic disk, an optical disk, etc.

Implementations of the present disclosure are described in detail above. In the present disclosure, specific examples are used to illustrate the principles and implementations of the present disclosure, and the descriptions of the above implementations are only used to facilitate understanding of the method of the present disclosure and the core idea thereof. Meanwhile, a person of ordinary skill in the art may make modifications to the specific implementations and application scopes according to the ideas of the present disclosure. Therefore, the contents of the specification shall not be construed as a limitation to the present disclosure.

What is claimed is:

1. A method for deformation measurement, applicable to an apparatus for deformation measurement, wherein the apparatus for deformation measurement comprises a camera array and a mobile platform, and the method comprises:

in response to the mobile platform moving to a first monitoring position in an area to-be-measured, obtaining a first image by photographing, by a first camera in the camera array, monitoring points in a first area to-be-measured in the area to-be-measured, and obtaining a second image by photographing, by a second camera in the camera array, monitoring points in a second area to-be-measured in the area to-be-measured; wherein the monitoring points in the first area to-be-measured are disposed on one side of the first monitoring position, the monitoring points in the second area to-be-measured are disposed on the other side of the first monitoring position, and the first camera has an opposite photographing direction with the second camera;

in response to the mobile platform moving to a second monitoring position in the area to-be-measured, obtaining a third image by photographing, by the first camera, the monitoring points in the first area to-be-measured, and obtaining a fourth image by photographing, by the second camera, the monitoring points in the second area to-be-measured;

determining $J_1$ first monitoring points according to the first image and the third image; and determining $J_2$ second monitoring points according to the second image and the fourth image; wherein the $J_1$ first monitoring points are monitoring points comprised in both the first image and the third image, and the $J_2$ second monitoring points are monitoring points comprised in both the second image and the fourth image; and obtaining a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image;

wherein obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image comprises:

obtaining $J_1$ first pixel coordinates corresponding to the $J_1$ first monitoring points in the first image;

obtaining $J_1$ second pixel coordinates corresponding to the $J_1$ first monitoring points in the third image;

for each of the $J_1$ first monitoring points, obtaining a first vertical variation and a first horizontal variation corresponding to a first monitoring point according to a first pixel coordinate and a second pixel coordinate corresponding to the first monitoring point;

obtaining $J_2$ third pixel coordinates corresponding to the $J_2$ second monitoring points in the second image;

obtaining $J_2$ fourth pixel coordinates corresponding to the $J_2$ second monitoring points in the fourth image;

for each of the $J_2$ second monitoring points, obtaining a second vertical variation and a second horizontal variation corresponding to a second monitoring point according to a third pixel coordinate and a fourth pixel coordinate corresponding to the second monitoring point; and determining the horizontal displacement amount and the vertical subsidence amount of each of the $J_1$ first monitoring points and the horizontal displacement amount and the vertical subsidence amount of each of the $J_2$ second monitoring points according to $J_1$ first vertical variations and $J_1$ first horizontal variations corresponding to the $J_1$ first monitoring points, $J_2$ second vertical variations and $J_2$ second horizontal variations corresponding to the $J_2$ second monitoring points, a first angle and a second angle of the camera array, $J_1$ first object space resolution corresponding to the $J_1$ first monitoring points, $J_2$ second object space resolution corresponding to the $J_2$ second monitoring points, $J_1$ first distances, $J_2$ second distances, and six-degree-of-freedom movements of the apparatus for deformation measurement, wherein the first angle is an angle between an optical axis of the first camera and a horizontal plane, the second angle is an angle between an optical axis of the second camera and the horizontal plane, the $J_1$ first distances are distances between the first camera and each of the $J_1$ first monitoring points respectively, and the $J_2$ second distances are distances between the second camera and each of the $J_2$ second monitoring points respectively.

2. The method of claim 1, wherein determining the horizontal displacement amount and the vertical subsidence amount of each of the $J_1$ first monitoring points and the horizontal displacement amount and the vertical subsidence amount of each of the $J_2$ second monitoring points according to the $J_1$ first vertical variations and the $J_1$ first horizontal variations corresponding to the $J_1$ first monitoring points, the $J_2$ second vertical variations and the $J_2$ second horizontal variations corresponding to the $J_2$ second monitoring points, the first angle and the second angle of the camera array, the $J_1$ first object space resolution corresponding to the $J_1$ first monitoring points, the $J_2$ second object space resolution corresponding to the $J_2$ second monitoring points, the $J_1$ first distances, the $J_2$ second distances, and the six-degree-of-freedom movements of the apparatus for deformation measurement comprises:

for each of the $J_1$ first monitoring points, obtaining a first equation set corresponding to a first monitoring point according to a first vertical variation, a first horizontal variation, a first angle, a first object space resolution, a first distance, and six-degree-of-freedom movements corresponding to the first monitoring point;

for each of $J_2$ second monitoring points, obtaining a second equation set corresponding to a second monitoring point according to a second vertical variation, a second horizontal variation, a second angle, a second object space resolution, a second distance, and six-degree-of-freedom movements corresponding to the second monitoring point;

obtaining a first target equation set and a second target equation set according to $J_1$ first equation sets corresponding to the $J_1$ first monitoring points and $J_2$ second equation sets corresponding to the $J_2$ second monitoring points; and obtaining the vertical subsidence amount of each of the $J_1$ first monitoring points and the vertical subsidence amount of each of the $J_2$ second monitoring points according to the first target equation set; and obtaining the horizontal displacement amount of each of the $J_1$ first monitoring points and the horizontal displacement amount of each of the $J_2$ second monitoring points according to the second target equation set.

3. An electronic device comprising:

a camera array;

a mobile platform;

a memory configured to store a computer program; and a processor connected to the memory and configured to execute the computer program stored in the memory to cause the electronic device to:

in response to the mobile platform moving to a first monitoring position in an area to-be-measured, obtain a first image by photographing, by a first camera in the camera array, monitoring points in a first area to-be-measured in the area to-be-measured, and obtain a second image by photographing, by a second camera in the camera array, monitoring points in a second area to-be-measured in the area to-be-measured; wherein the monitoring points in the first area to-be-measured are disposed on one side of the first monitoring position, the monitoring points in the second area to-be-measured are disposed on the other side of the first monitoring position, and the first camera has an opposite photographing direction with the second camera;

in response to the mobile platform moving to a second monitoring position in the area to-be-measured, obtain a third image by photographing, by the first camera, the monitoring points in the first area to-be-measured, and obtain a fourth image by photographing, by the second camera, the monitoring points in the second area to-be-measured;

determine $J_1$ first monitoring points according to the first image and the third image; and determine $J_2$ second monitoring points according to the second image and the fourth image; wherein the $J_1$ first monitoring points are monitoring points comprised in both the first image and the third image, and the $J_2$ second monitoring points are monitoring points comprised in both the second image and the fourth image; and obtain a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image;

wherein the number of $J_1$ first monitoring points is even, and the $J_1$ first monitoring points comprises $J_1/2$ third monitoring points and $J_1/2$ fourth monitoring points;

wherein the number of $J_2$ second monitoring points is even, and the $J_2$ second monitoring points comprises $J_2/2$ fifth monitoring points and $J_2/2$ sixth monitoring points; and wherein in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the processor is configured to execute the computer program stored in the memory to cause the electronic device to:

obtain a horizontal displacement amount of each of the $J_1/2$ third monitoring points, a horizontal displacement amount of each of the $J_2/2$ fifth monitoring points, a vertical subsidence amount of each of the $J_1/2$ fourth monitoring points, and a vertical subsidence amount of each of the $J_2/2$ sixth monitoring points according to the first image, the second image, the third image, and the fourth image.

4. The electronic device of claim 3, wherein in terms of obtaining the horizontal displacement amount of each of the $J_1/2$ third monitoring points, the horizontal displacement amount of each of the $J_2/2$ fifth monitoring points, the vertical subsidence amount of each of the $J_1/2$ fourth monitoring points, and the vertical subsidence amount of each of the $J_2/2$ sixth monitoring points according to the first image, the second image, the third image, and the fourth image, the processor is configured to execute the computer program stored in the memory to cause the electronic device to:

obtain $J_1/2$ fifth pixel coordinates corresponding to the $J_1/2$ third monitoring points in the first image and $J_1/2$ sixth pixel coordinates corresponding to the $J_1/2$ third monitoring points in the third image;

obtain $J_2/2$ seventh pixel coordinates corresponding to the $J_2/2$ fifth monitoring points in the second image and $J_2/2$ eighth pixel coordinates corresponding to the $J_2/2$ fifth monitoring points in the fourth image;

for each of the $J_1/2$ third monitoring points, obtain a third horizontal variation corresponding to a third monitoring point according to a fifth pixel coordinate and a sixth pixel coordinate corresponding to the third monitoring point; and for each of the $J_2/2$ fifth monitoring points, obtaining a fourth horizontal variation corresponding to a fifth monitoring point according to a seventh pixel coordinate and an eighth pixel coordinate corresponding to the fifth monitoring point;

obtain $J_1/2$ ninth pixel coordinates corresponding to the $J_1/2$ fourth monitoring points in the first image and $J_1/2$ tenth pixel coordinates corresponding to the $J_1/2$ fourth monitoring points in the third image;

obtain $J_2/2$ eleventh pixel coordinates corresponding to the $J_2/2$ sixth monitoring points in the second image and $J_2/2$ twelfth pixel coordinates corresponding to the $J_2/2$ sixth monitoring points in the fourth image;

for each of the $J_1/2$ fourth monitoring points, obtain a third vertical variation corresponding to a fourth monitoring point according to a ninth pixel coordinate and a tenth pixel coordinate corresponding to the fourth monitoring point; and for each of the $J_2/2$ sixth monitoring points, obtain a fourth vertical variation corresponding to a sixth monitoring point according to an eleventh pixel coordinate and a twelfth pixel coordinate corresponding to the sixth monitoring point;

determine the horizontal displacement amount of each of the $J_1/2$ third monitoring points and the horizontal displacement amount of each of the $J_2/2$ fifth monitoring points according to $J_1/2$ third horizontal variations corresponding to the $J_1/2$ third monitoring points, $J_2/2$ fourth horizontal variations corresponding to the $J_2/2$ fifth monitoring points, a first angle and a second angle of the camera array, $J_1/2$ third object space resolution corresponding to the $J_1/2$ third monitoring points, $J_2/2$ fourth object space resolution corresponding to the $J_2/2$ fifth monitoring points, $J_1/2$ third distances, $J_2/2$ fourth distances, and three-degree-of-freedom movements of the apparatus for deformation measurement, wherein the first angle is an angle between an optical axis of the first camera and a horizontal plane, the second angle is an angle between an optical axis of the second camera and the horizontal plane, the $J_1/2$ third distances are distances between the first camera and each of the $J_1/2$ third monitoring points respectively, and the $J_2/2$ fourth distances are distances between the second camera and each of the $J_2/2$ fifth monitoring points respectively; and determine the vertical subsidence amount of each of the $J_1/2$ fourth monitoring points and the vertical subsidence amount of each of the $J_2/2$ sixth monitoring points according to $J_1/2$ third vertical variations corresponding to the $J_1/2$ fourth monitoring points, $J_2/2$ fourth vertical variations corresponding to the $J_2/2$ sixth monitoring points, the first angle and the second angle of the camera array, $J_1/2$ fifth object space resolution corresponding to the $J_1/2$ fourth monitoring points, $J_2/2$ sixth object space resolution corresponding to the $J_2/2$ sixth monitoring points, $J_1/2$ fifth distances, $J_2/2$ sixth distances, and five-degree-of-freedom movements of the apparatus for deformation measurement, wherein the first angle is the angle between the optical axis of the first camera and the horizontal plane, the second angle is the angle between the optical axis of the second camera and the horizontal plane, the $J_1/2$ fifth distances are distances between the first camera and each of the $J_1/2$ fourth monitoring points respectively, and the $J_2/2$ sixth distances are distances between the second camera and each of the $J_2/2$ sixth monitoring points respectively.

5. The electronic device of claim 4, wherein in terms of determining the horizontal displacement amount of each of the $J_1/2$ third monitoring points and the horizontal displacement amount of each of the $J_2/2$ fifth monitoring points according to the $J_1/2$ third horizontal variations corresponding to the $J_1/2$ third monitoring points, the $J_2/2$ fourth horizontal variations corresponding to the $J_2/2$ fifth monitoring points, the first angle and the second angle of the camera array, the $J_1/2$ third object space resolution corresponding to the $J_1/2$ third monitoring points, the $J_2/2$ fourth object space resolution corresponding to the $J_2/2$ fifth monitoring points, the $J_1/2$ third distances, the $J_2/2$ fourth distances, and the three-degree-of-freedom movements of the apparatus for deformation measurement, the processor is configured to execute the computer program stored in the memory to cause the electronic device to:

for each of the $J_1/2$ third monitoring points, obtain a first equation corresponding to a third monitoring point according to a third horizontal variation, a third object space resolution, a third distance, a first angle, and three-degree-of-freedom movements corresponding to the third monitoring point;

for each of the $J_2/2$ fifth monitoring points, obtain a second equation corresponding to a fifth monitoring point according to a fourth horizontal variation, a fourth object space resolution, a fourth distance, a second angle, and three-degree-of-freedom movements corresponding to the fifth monitoring point;

obtain a third target equation set according to $J_1/2$ first equations corresponding to the $J_1/2$ third monitoring points and $J_2/2$ second equations corresponding to the $J_2/2$ fifth monitoring points; and obtain the horizontal displacement amount of each of the $J_1/2$ third monitoring points and the horizontal displacement amount of each of the $J_2/2$ fifth monitoring points according to the third target equation set.

6. The electronic device of claim 4, wherein in terms of determining the vertical subsidence amount of each of the $J_1/2$ fourth monitoring points and the vertical subsidence amount of each of the $J_2/2$ sixth monitoring points according to the $J_1/2$ third vertical variations corresponding to the $J_1/2$ fourth monitoring points, the $J_2/2$ fourth vertical variations corresponding to the $J_2/2$ sixth monitoring points, the first angle and the second angle of the camera array, the $J_1/2$ fifth object space resolution corresponding to the $J_1/2$ fourth monitoring points, the $J_2/2$ sixth object space resolution corresponding to the $J_2/2$ sixth monitoring points, the $J_1/2$ fifth distances, the $J_2/2$ sixth distances, and the five-degree-of-freedom movements of the apparatus for deformation measurement, the processor is configured to execute the computer program stored in the memory to cause the electronic device to:

for each of the $J_1/2$ fourth monitoring points, obtain a third equation corresponding to a fourth monitoring point according to a third vertical variation, a fifth object space resolution, a fifth distance, a first angle, and five-degree-of-freedom movements corresponding to the fourth monitoring point;

for each of the $J_2/2$ sixth monitoring points, obtain a fourth equation corresponding to a sixth monitoring point according to a fourth vertical variation, a sixth object space resolution, a sixth distance, a second angle, and five-degree-of-freedom movements corresponding to the sixth monitoring point;

obtain a fourth target equation set according to $J_1/2$ third equations corresponding to the $J_1/2$ fourth monitoring points and $J_2/2$ fourth equations corresponding to the $J_2/2$ sixth monitoring points; and obtain the vertical subsidence amount of each of the $J_1/2$ fourth monitoring points and the vertical subsidence amount of each of the $J_2/2$ sixth monitoring points according to the fourth target equation set.

7. A non-transitory computer-readable storage medium configured to store a computer program which, when executed by a processor, causes the processor to:

in response to the mobile platform moving to a first monitoring position in an area to-be-measured, obtain a first image by photographing, by a first camera in the camera array, monitoring points in a first area to-be-measured in the area to-be-measured, and obtain a second image by photographing, by a second camera in the camera array, monitoring points in a second area to-be-measured in the area to-be-measured; wherein the monitoring points in the first area to-be-measured are disposed on one side of the first monitoring position, the monitoring points in the second area to-be-measured are disposed on the other side of the first monitoring position, and the first camera has an opposite photographing direction with the second camera;

in response to the mobile platform moving to a second monitoring position in the area to-be-measured, obtain a third image by photographing, by the first camera, the monitoring points in the first area to-be-measured, and obtain a fourth image by photographing, by the second camera, the monitoring points in the second area to-be-measured;

determine $J_1$ first monitoring points according to the first image and the third image; and determine $J_2$ second monitoring points according to the second image and the fourth image; wherein the $J_1$ first monitoring points are monitoring points comprised in both the first image and the third image, and the $J_2$ second monitoring points are monitoring points comprised in both the second image and the fourth image; and obtain a horizontal displacement amount and a vertical subsidence amount of each of the $J_1$ first monitoring points and a horizontal displacement amount and a vertical subsidence amount of each of the $J_2$ second monitoring points according to the first image, the second image, the third image, and the fourth image;

wherein in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the computer program causes the processor to:

obtain $J_1$ first pixel coordinates corresponding to the $J_1$ first monitoring points in the first image; obtain $J_1$ second pixel coordinates corresponding to the $J_1$ first monitoring points in the third image; for each of the $J_1$ first monitoring points, obtain a first vertical variation and a first horizontal variation corresponding to a first monitoring point according to a first pixel coordinate and a second pixel coordinate corresponding to the first monitoring point; obtain $J_2$ third pixel coordinates corresponding to the $J_2$ second monitoring points in the second image; obtain $J_2$ fourth pixel coordinates corresponding to the $J_2$ second monitoring points in the fourth image; for each of the $J_2$ second monitoring points, obtain a second vertical variation and a second horizontal variation corresponding to a second monitoring point according to a third pixel coordinate and a fourth pixel coordinate corresponding to the second monitoring point; and determine the horizontal displacement amount and the vertical subsidence amount of each of the $J_1$ first monitoring points and the horizontal displacement amount and the vertical subsidence amount of each of the $J_2$ second monitoring points according to $J_1$ first vertical variations and $J_1$ first horizontal variations corresponding to the $J_1$ first monitoring points, $J_2$ second vertical variations and $J_2$ second horizontal variations corresponding to the $J_2$ second monitoring points, a first angle and a second angle of the camera array, $J_1$ first object space resolution corresponding to the $J_1$ first monitoring points, $J_2$ second object space resolution corresponding to the $J_2$ second monitoring points, $J_1$ first distances, $J_2$ second distances, and six-degree-of-freedom movements of the apparatus for deformation measurement, wherein the first angle is an angle between an optical axis of the first camera and a horizontal plane, the second angle is an angle between an optical axis of the second camera and the horizontal plane, the $J_1$ first distances are distances between the first camera and each of the $J_1$ first monitoring points respectively, and the $J_2$ second distances are distances between the second camera and each of the $J_2$ second monitoring points respectively; or wherein the number of $J_1$ first monitoring points is even, and the $J_1$ first monitoring points comprises $J_1/2$ third monitoring points and $J_1/2$ fourth monitoring points; the number of $J_2$ second monitoring points is even, and the $J_2$ second monitoring points comprises $J_2/2$ fifth monitoring points and $J_2/2$ sixth monitoring points; and in terms of obtaining the horizontal displacement amount and the vertical subsidence amount of each of the $J_1$ first monitoring points and the horizontal displacement amount and the vertical subsidence amount of each of the $J_2$ second monitoring points according to the first image, the second image, the third image, and the fourth image, the computer program causes the processor to: obtain a horizontal displacement amount of each of the $J_1/2$ third monitoring points, a horizontal displacement amount of each of the $J_2/2$ fifth monitoring points, a vertical subsidence amount of each of the $J_1/2$ fourth monitoring points, and a vertical subsidence amount of each of the $J_2/2$ sixth monitoring points according to the first image, the second image, the third image, and the fourth image.

8. The non-transitory computer-readable storage medium of claim 7, wherein in terms of determining the horizontal displacement amount and the vertical subsidence amount of each of the $J_1$ first monitoring points and the horizontal displacement amount and the vertical subsidence amount of each of the $J_2$ second monitoring points according to the $J_1$ first vertical variations and the $J_1$ first horizontal variations corresponding to the $J_1$ first monitoring points, the $J_2$ second vertical variations and the $J_2$ second horizontal variations corresponding to the $J_2$ second monitoring points, the first angle and the second angle of the camera array, the $J_1$ first object space resolution corresponding to the $J_1$ first monitoring points, the $J_2$ second object space resolution corresponding to the $J_2$ second monitoring points, the $J_1$ first distances, the $J_2$ second distances, and the six-degree-of-freedom movements of the apparatus for deformation measurement, the computer program causes the processor to:

for each of the $J_1$ first monitoring points, obtain a first equation set corresponding to a first monitoring point according to a first vertical variation, a first horizontal variation, a first angle, a first object space resolution, a first distance, and six-degree-of-freedom movements corresponding to the first monitoring point;

for each of $J_2$ second monitoring points, obtain a second equation set corresponding to a second monitoring point according to a second vertical variation, a second horizontal variation, a second angle, a second object space resolution, a second distance, and six-degree-of-freedom movements corresponding to the second monitoring point;

obtain a first target equation set and a second target equation set according to $J_1$ first equation sets corresponding to the $J_1$ first monitoring points and $J_2$ second equation sets corresponding to the $J_2$ second monitoring points; and obtain the vertical subsidence amount of each of the $J_1$ first monitoring points and the vertical subsidence amount of each of the $J_2$ second monitoring points according to the first target equation set; and obtaining the horizontal displacement amount of each of the $J_1$ first monitoring points and the horizontal displacement amount of each of the $J_2$ second monitoring points according to the second target equation set.

9. The non-transitory computer-readable storage medium of claim 7, wherein in terms of obtaining the horizontal displacement amount of each of the $J_1/2$ third monitoring points, the horizontal displacement amount of each of the $J_2/2$ fifth monitoring points, the vertical subsidence amount of each of the $J_1/2$ fourth monitoring points, and the vertical subsidence amount of each of the $J_2/2$ sixth monitoring points according to the first image, the second image, the third image, and the fourth image, the computer program causes the processor to:

obtain $J_1/2$ fifth pixel coordinates corresponding to the $J_1/2$ third monitoring points in the first image and $J_1/2$ sixth pixel coordinates corresponding to the $J_1/2$ third monitoring points in the third image;

obtain $J_2/2$ seventh pixel coordinates corresponding to the $J_2/2$ fifth monitoring points in the second image and $J_2/2$ eighth pixel coordinates corresponding to the $J_2/2$ fifth monitoring points in the fourth image;

for each of the $J_1/2$ third monitoring points, obtain a third horizontal variation corresponding to a third monitoring point according to a fifth pixel coordinate and a sixth pixel coordinate corresponding to the third monitoring point; and for each of the $J_2/2$ fifth monitoring points, obtaining a fourth horizontal variation corresponding to a fifth monitoring point according to a seventh pixel coordinate and an eighth pixel coordinate corresponding to the fifth monitoring point;

obtain $J_1/2$ ninth pixel coordinates corresponding to the $J_1/2$ fourth monitoring points in the first image and $J_1/2$ tenth pixel coordinates corresponding to the $J_1/2$ fourth monitoring points in the third image;

obtain $J_2/2$ eleventh pixel coordinates corresponding to the $J_2/2$ sixth monitoring points in the second image and $J_2/2$ twelfth pixel coordinates corresponding to the $J_2/2$ sixth monitoring points in the fourth image;

for each of the $J_1/2$ fourth monitoring points, obtain a third vertical variation corresponding to a fourth monitoring point according to a ninth pixel coordinate and a tenth pixel coordinate corresponding to the fourth monitoring point; and for each of the $J_2/2$ sixth monitoring points, obtain a fourth vertical variation corresponding to a sixth monitoring point according to an eleventh pixel coordinate and a twelfth pixel coordinate corresponding to the sixth monitoring point;

determine the horizontal displacement amount of each of the $J_1/2$ third monitoring points and the horizontal displacement amount of each of the $J_2/2$ fifth monitoring points according to $J_1/2$ third horizontal variations corresponding to the $J_1/2$ third monitoring points, $J_2/2$ fourth horizontal variations corresponding to the $J_2/2$ fifth monitoring points, a first angle and a second angle of the camera array, $J_1/2$ third object space resolution corresponding to the $J_1/2$ third monitoring points, $J_2/2$ fourth object space resolution corresponding to the $J_2/2$ fifth monitoring points, $J_1/2$ third distances, $J_2/2$ fourth distances, and three-degree-of-freedom movements of the apparatus for deformation measurement, wherein the first angle is an angle between an optical axis of the first camera and a horizontal plane, the second angle is an angle between an optical axis of the second camera and the horizontal plane, the $J_1/2$ third distances are distances between the first camera and each of the $J_1/2$ third monitoring points respectively, and the $J_2/2$ fourth distances are distances between the second camera and each of the $J_2/2$ fifth monitoring points respectively; and determine the vertical subsidence amount of each of the $J_1/2$ fourth monitoring points and the vertical subsidence amount of each of the $J_2/2$ sixth monitoring points according to $J_1/2$ third vertical variations corresponding to the $J_1/2$ fourth monitoring points, $J_2/2$ fourth vertical variations corresponding to the $J_2/2$ sixth monitoring points, the first angle and the second angle of the camera array, $J_1/2$ fifth object space resolution corresponding to the $J_1/2$ fourth monitoring points, $J_2/2$ sixth object space resolution corresponding to the $J_2/2$ sixth monitoring points, $J_1/2$ fifth distances, $J_2/2$ sixth distances, and five-degree-of-freedom movements of the apparatus for deformation measurement, wherein the first angle is the angle between the optical axis of the first camera and the horizontal plane, the second angle is the angle between the optical axis of the second camera and the horizontal plane, the $J_1/2$ fifth distances are distances between the first camera and each of the $J_1/2$ fourth monitoring points respectively, and the $J_2/2$ sixth distances are distances between the second camera and each of the $J_2/2$ sixth monitoring points respectively.

10. The non-transitory computer-readable storage medium of claim 9, wherein in terms of determining the horizontal displacement amount of each of the $J_1/2$ third monitoring points and the horizontal displacement amount of each of the $J_2/2$ fifth monitoring points according to the $J_1/2$ third horizontal variations corresponding to the $J_1/2$ third monitoring points, the $J_2/2$ fourth horizontal variations corresponding to the $J_2/2$ fifth monitoring points, the first angle and the second angle of the camera array, the $J_1/2$ third object space resolution corresponding to the $J_1/2$ third monitoring points, the $J_2/2$ fourth object space resolution corresponding to the $J_2/2$ fifth monitoring points, the $J_1/2$ third distances, the $J_2/2$ fourth distances, and the three-degree-of-freedom movements of the apparatus for deformation measurement, the computer program causes the processor to:

for each of the $J_1/2$ third monitoring points, obtain a first equation corresponding to a third monitoring point according to a third horizontal variation, a third object space resolution, a third distance, a first angle, and three-degree-of-freedom movements corresponding to the third monitoring point;

for each of the $J_2/2$ fifth monitoring points, obtain a second equation corresponding to a fifth monitoring point according to a fourth horizontal variation, a fourth object space resolution, a fourth distance, a second angle, and three-degree-of-freedom movements corresponding to the fifth monitoring point;

obtain a third target equation set according to $J_1/2$ first equations corresponding to the $J_1/2$ third monitoring points and $J_2/2$ second equations corresponding to the $J_2/2$ fifth monitoring points; and obtain the horizontal displacement amount of each of the $J_1/2$ third monitoring points and the horizontal displacement amount of each of the $J_2/2$ fifth monitoring points according to the third target equation set.

* * * * *